US011393491B2

(12) United States Patent
Han et al.

(10) Patent No.: US 11,393,491 B2
(45) Date of Patent: Jul. 19, 2022

(54) ARTIFICIAL INTELLIGENCE DEVICE CAPABLE OF CONTROLLING OPERATION OF ANOTHER DEVICE AND METHOD OF OPERATING THE SAME

(71) Applicant: LG ELECTRONICS INC., Seoul (KR)

(72) Inventors: Jongwoo Han, Seoul (KR); Hangil Jeong, Seoul (KR); Heeyeon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 274 days.

(21) Appl. No.: 16/498,334

(22) PCT Filed: Jun. 4, 2019

(86) PCT No.: PCT/KR2019/006764
§ 371 (c)(1),
(2) Date: Sep. 26, 2019

(87) PCT Pub. No.: WO2020/246634
PCT Pub. Date: Dec. 10, 2020

(65) Prior Publication Data
US 2021/0366506 A1    Nov. 25, 2021

(51) Int. Cl.
*G10L 25/60* (2013.01)
*H04W 4/80* (2018.01)
(Continued)

(52) U.S. Cl.
CPC .............. *G10L 25/60* (2013.01); *G06N 3/063* (2013.01); *G10L 15/08* (2013.01); *G10L 25/30* (2013.01);
(Continued)

(58) Field of Classification Search
CPC ... G10L 25/60; G10L 25/30; G10L 2015/088; G10L 15/22; G10L 15/265; H04W 4/80; G06N 3/063; G06F 3/167; H04M 2201/40
(Continued)

(56) References Cited

U.S. PATENT DOCUMENTS 10,580,405 B1 * 3/2020 Wang ..................... G10L 17/22
2013/0238326 A1 9/2013 Kim et al.
(Continued)

FOREIGN PATENT DOCUMENTS

KR  10-2014-0106715 A  9/2014
KR  10-2018-0034637 A  4/2018
(Continued)

*Primary Examiner* — Jesse S Pullias
(74) *Attorney, Agent, or Firm* — Birch, Stewart, Kolasch & Birch, LLP

(57) ABSTRACT

An artificial intelligence device includes a microphone configured to receive a command uttered by a user, a wireless communication unit configured to perform communication with an external artificial intelligence device, and a processor configured to receive a first operation command through the microphone, acquire a first speech quality level and a first intention of the received first operation command, determine a first external artificial intelligence device to perform the acquired first intention, transmit a first control command corresponding to the first intention to the determined first external artificial intelligence device, receive a second operation command through the microphone, acquire a second speech quality level and a second intention of the received second operation command, and determine that a device to be controlled is changed when a difference between the first speech quality level and the second speech quality level is equal to or greater than a predetermined level range.

15 Claims, 17 Drawing Sheets

(51) Int. Cl.
  *G06N 3/063*  (2006.01)
  *G10L 15/08*  (2006.01)
  *G10L 25/30*  (2013.01)

(52) U.S. Cl.
  CPC ......... *H04W 4/80* (2018.02); *G10L 2015/088* (2013.01)

(58) Field of Classification Search
  USPC .................................. 704/231–257, 270–275
  See application file for complete search history.

(56) References Cited

U.S. PATENT DOCUMENTS

| | | |
|---|---|---|
| 2014/0078242 A1 | 3/2014 | Onuma et al. |
| 2015/0382047 A1* | 12/2015 | Van Os .................... G10L 17/22 |
| | | 725/38 |
| 2017/0025124 A1* | 1/2017 | Mixter .................... G10L 15/22 |
| 2017/0092270 A1* | 3/2017 | Ewen ................ H04N 21/4394 |
| 2017/0361468 A1* | 12/2017 | Cheuvront ................ G06F 3/16 |
| 2019/0019509 A1 | 1/2019 | Lee et al. |
| 2019/0102145 A1* | 4/2019 | Wilberding ............. G10L 15/22 |
| 2019/0295542 A1* | 9/2019 | Huang .................... G10L 15/30 |

FOREIGN PATENT DOCUMENTS

| | | |
|---|---|---|
| KR | 10-2019-0008663 A | 1/2019 |
| KR | 10-2019-0016260 A | 2/2019 |

* cited by examiner

| | DISTANCE BETWEEN AI HUB DEVICE AND FIRST EXTERNAL ARTIFICIAL INTELLIGENCE DEVICE | DISTANCE BETWEEN AI HUB DEVICE AND SECOND EXTERNAL ARTIFICIAL INTELLIGENCE DEVICE |
|---|---|---|
| | 3m | 5m |
| PRIORITY | 1 | 2 |

ARTIFICIAL INTELLIGENCE DEVICE CAPABLE OF CONTROLLING OPERATION OF ANOTHER DEVICE AND METHOD OF OPERATING THE SAME

CROSS REFERENCE TO RELATED APPLICATIONS

This application is the National Phase of PCT/KR2019/006764 filed on Jun. 4, 2019, which is hereby expressly incorporated by reference into the present application.

TECHNICAL FIELD

The present invention relates to an artificial intelligence device and, more particularly, to an artificial intelligence device capable of selecting a device capable of performing operation in response to a speech command of a user.

BACKGROUND ART

Competition for speech recognition technology which has started in smartphones is expected to become fiercer in the home with diffusion of the Internet of things (IoT).

In particular, an artificial intelligence (AI) device capable of issuing a command using speech and having a talk is noteworthy.

A speech recognition service has a structure for selecting an optimal answer to a user's question using a vast amount of database.

A speech search function refers to a method of converting input speech data into text in a cloud server, analyzing the text and retransmitting a real-time search result to a device.

The cloud server has a computing capability capable of dividing a large number of words into speech data according to gender, age and intonation and storing and processing the speech data in real time.

As more speech data is accumulated, speech recognition will be accurate, thereby achieving human parity.

Recently, a plurality of artificial intelligence devices capable of performing speech recognition is located in the home.

In order to select an artificial intelligence device to be controlled by a user, an uttered command is analyzed and a device is determined according to the result of analysis.

However, in the case where the plurality of artificial intelligence devices is located in the home, it is not clear which device should operate when the command uttered by the user does not specify a device.

DISCLOSURE

Technical Problem

An object of the present invention is to solve the above-described problem and the other problems.

Another object of the present invention is to provide an artificial intelligence device capable of selecting a device to be controlled from among a plurality of artificial intelligence devices using speech quality and intention of an operation command uttered by a user.

Another object of the present invention is to provide an artificial intelligence device capable of selecting a device to be controlled from among a plurality of artificial intelligence devices according to the volume and intention of an operation command uttered by the user.

Technical Solution

An artificial intelligence device according to an embodiment of the present invention can select a device to be controlled depending on whether speech quality of a received operation command is changed and an intention of the operation command.

An artificial intelligence device according to an embodiment of the present invention can select any one of a plurality of external artificial intelligence devices as a device to be controlled depending on whether volume change of an operation command is within a predetermined range.

Advantageous Effects

According to the embodiment of the present invention, since a device to be controlled is selected according to speech quality of a command, a user can more easily select the device to be controlled.

According to the embodiment of the present invention, since a device to be controlled is selected according to the volume of a command, a user can select the device to be controlled without confusion, by only changing the volume of their voice.

According to the embodiment of the present invention, it is possible to grasp the volume and intention of a speech command of a user and to clearly select a device to perform operation corresponding to the speech command. Accordingly, the user can obtain a desired result, by only uttering the speech command while changing the volume of utterance.

In addition, the user can accurately obtain a desired result by uttering only a command for performing desired operation without uttering the name of a device, thereby improving user experience.

BEST MODE

Figure 1:
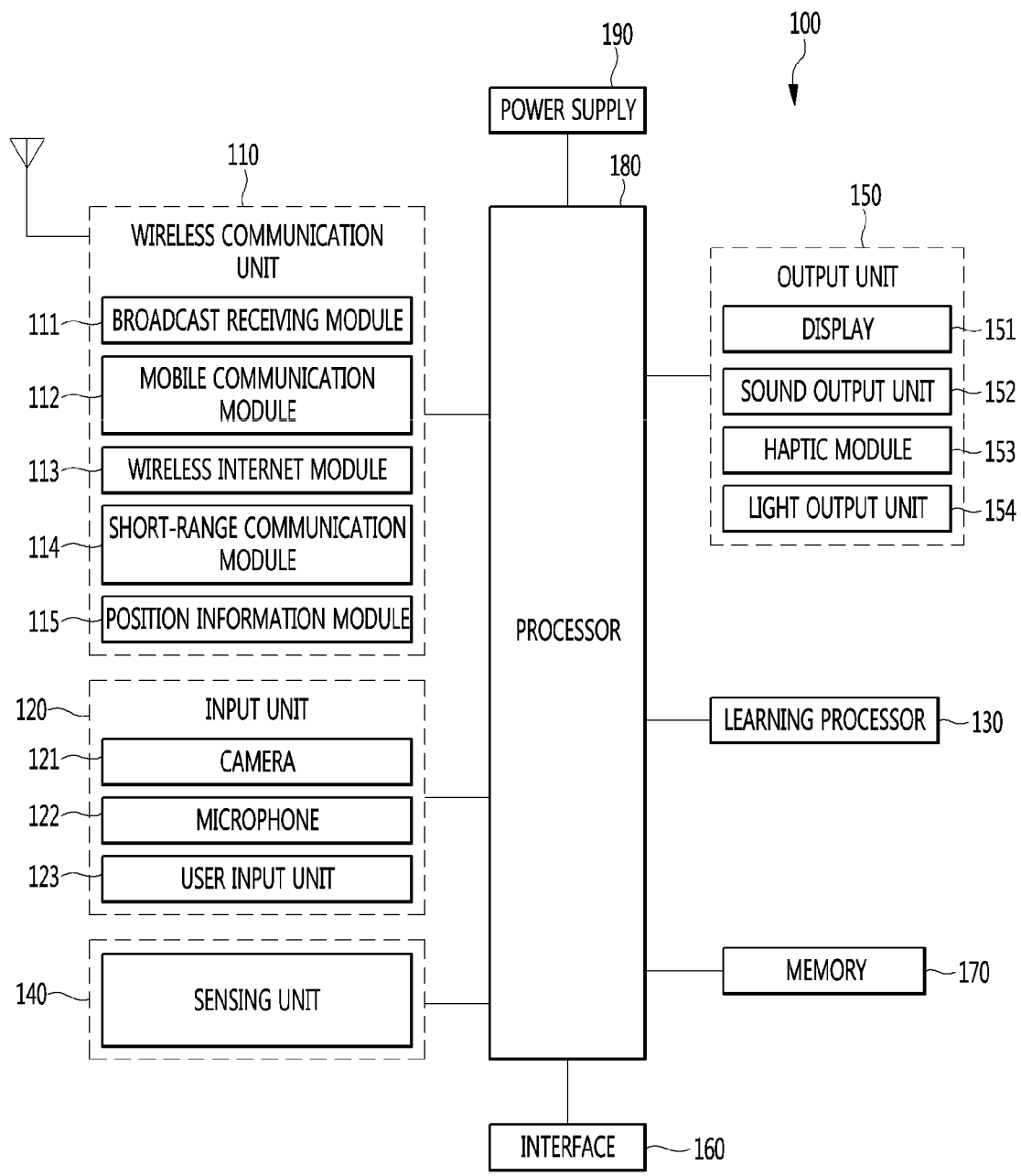
FIG. 1 is a block diagram illustrating an artificial intelligence device according to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While ordinal numbers including 'first', 'second', etc. may be used to describe various components, they are not intended to limit the components. These expressions may be used to distinguish one component from another component When it is said that a component is 'coupled with/to' or 'connected to' another component, it should be understood that the one component is connected to the other component directly or through any other component in between. On the other hand, when it is said that a component is 'directly connected to' or 'directly coupled to' another component, it should be understood that there is no other component between the components.

The artificial intelligence device described in this specification may include cellular phones, smart phones, laptop computers, digital broadcast artificial intelligence devices, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

However, the artificial intelligence device 100 described in this specification is applicable to stationary artificial intelligence devices such as smart TVs, desktop computers or digital signages.

In addition, the artificial intelligence device 100 according to the embodiment of the present invention is applicable to stationary or mobile robots.

In addition, the artificial intelligence device 100 according to the embodiment of the present invention may perform the function of a speech agent. The speech agent may be a program for recognizing the speech of a user and audibly outputting a response suitable to the recognized speech of the user.

The artificial intelligence device 100 may include a wireless communication unit 110, an input unit 120, a learning processor 130, a sensing unit 140, an output unit 150, an interface 160, a memory 170, a processor 180 and a power supply 190.

The wireless communication unit 110 may include at least one of a broadcast reception module 111, a mobile communication module 112, a wireless Internet module 113, a short-range communication module 114 and a location information module 115.

The broadcast reception module 111 receives broadcast signals and/or broadcast associated information from an external broadcast management server through a broadcast channel.

The mobile communication module 112 may transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be installed inside or outside the artificial intelligence device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication module 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to acquire the position (or the current position) of the mobile artificial intelligence device. Representative examples thereof include a Global Position System (GPS) module or a Wi-Fi module. As one example, when the artificial intelligence device uses a GPS module, the position of the mobile artificial intelligence device may be acquired using a signal sent from a GPS satellite.

The input unit 120 may include a camera 121 for receiving a video signal, a microphone 122 for receiving an audio signal, and a user input unit 123 for receiving information from a user.

Voice data or image data collected by the input unit 120 may be analyzed and processed as a control command of the user.

The input unit 120 may receive video information (or signal), audio information (or signal), data or user input information. For reception of video information, the artificial intelligence device 100 may include one or a plurality of cameras 121.

The camera 121 may process image frames of still images or moving images obtained by image sensors in a video call more or an image capture mode. The processed image frames can be displayed on the display 151 or stored in memory 170.

The microphone 122 processes an external acoustic signal into electrical audio data. The processed audio data may be variously used according to function (application program) executed in the artificial intelligence device 100. Meanwhile, the microphone 122 may include various noise removal algorithms to remove noise generated in the process of receiving the external acoustic signal.

The user input unit 123 receives information from a user. When information is received through the user input unit 123, The processor 180 may control operation of the artificial intelligence device 100 in correspondence with the input information.

The user input unit 123 may include one or more of a mechanical input element (for example, a mechanical key, a button located on a front and/or rear surface or a side surface of the artificial intelligence device 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The learning processor 130 may be configured to receive, classify, store and output information to be used for data mining, data analysis, intelligent decision, mechanical learning algorithms and techniques.

The learning processor 130 may include one or more memory units configured to store data received, detected, sensed, generated or output in a predetermined manner or another manner by the artificial intelligence device or received, detected, sensed, generated or output in a predetermined manner or another manner by another component, device, artificial intelligence device or device for communicating with the artificial intelligence device.

The learning processor 130 may include a memory integrated with or implemented in the artificial intelligence device. In some embodiment, the learning processor 130 may be implemented using the memory 170.

Selectively or additionally, the learning processor 130 may be implemented using a memory related to the artificial intelligence device, such as an external memory directly coupled to the artificial intelligence device or a memory maintained in a server communicating with the artificial intelligence device.

In another embodiment, the learning processor 130 may be implemented using a memory maintained in a cloud computing environment or another remote memory accessible by the artificial intelligence device through the same communication scheme as a network.

The learning processor 130 may be configured to store data in one or more databases in order to identify, index, categorize, manipulate, store, retrieve and output data to be used for supervised or unsupervised learning, data mining, predictive analysis or other machines.

Information stored in the learning processor 130 may be used by one or more other controllers of the artificial intelligence device or the processor 180 using any one of different types of data analysis algorithms and machine learning algorithms.

Examples of such algorithms include k-nearest neighbor systems, fuzzy logic (e.g., possibility theory), neural networks, Boltzmann machines, vector quantization, pulse neural networks, support vector machines, maximum margin classifiers, hill climbing, inductive logic system Bayesian networks, Petri Nets (e.g., finite state machines, Mealy machines or Moore finite state machines), classifier trees (e.g., perceptron trees, support vector trees, Marcov trees, decision tree forests, random forests), betting models and systems, artificial fusion, sensor fusion, image fusion, reinforcement learning, augmented reality, pattern recognition, and automated planning.

The processor 180 may make a decision using data analysis and machine learning algorithms and determine or predict at least one executable operation of the artificial intelligence device based on the generated information. To this end, the processor 180 may request, retrieve, receive or use the data of the processor 130 and control the artificial intelligence device to execute preferable operation or predicted operation of at least one executable operation.

The processor 180 may perform various functions for implementing intelligent emulation (that is, a knowledge based system, an inference system and a knowledge acquisition system). This is applicable to various types of systems (e.g., a fussy logic system) including an adaptive system, a machine learning system, an artificial neural system, etc.

The processor 180 may include a sub module for enabling operation involving speech and natural language speech processing, such as an I/O processing module, an environmental condition module, speech-to-text (STT) processing module, a natural language processing module, a workflow processing module and a service processing module.

Each of such sub modules may have an access to one or more systems or data and models at the artificial intelligence device or a subset or superset thereof. In addition, each of the sub modules may provide various functions including vocabulary index, user data, a workflow model, a service model and an automatic speech recognition (ASR) system.

In another embodiment, the other aspects of the processor 180 or the artificial intelligence device may be implemented through the above-described sub modules, systems or data and models.

In some embodiments, based on the data of the learning processor 130, the processor 180 may be configured to detect and sense requirements based on the context condition or user's intention expressed in user input or natural language input.

The processor 180 may actively derive and acquire information necessary to fully determine the requirements based on the context condition or user's intention. For example, the processor 180 may actively derive information necessary to determine the requirements, by analyzing historical data including historical input and output, pattern matching, unambiguous words, and input intention, etc.

The processor 180 may determine a task flow for executing a function for responding to the requirements based on the context condition or the user's intention.

The processor 180 may be configured to collect, sense, extract, detect and/or receive signals or data used for data analysis and machine learning operations through one or more sensing components at the artificial intelligence device, in order to collect information for processing and storage from the learning processor 130.

Information collection may include sensing information through a sensor, extracting information stored in the memory 170, or receiving information from another artificial intelligence device, an entity or an external storage device through a communication unit.

The processor 180 may collect and store usage history information from the artificial intelligence device.

The processor 180 may determine the best match for executing a specific function using the stored usage history information and predictive modeling.

The processor 180 may receive or sense surrounding environment information or other information through the sensing unit 140.

The processor 180 may receive broadcast signals and/or broadcast related information, wireless signals or wireless data through the wireless communication unit 110.

The processor 180 may receive image information (or signals corresponding thereto), audio signal (or signals corresponding thereto), data or user input information from the input unit 120.

The processor 180 may collect information in real time, process or classify the information (e.g., a knowledge graph, a command policy, a personalization database, a dialog engine, etc.), and store the processed information in the memory 170 or the learning processor 130.

When the operation of the artificial intelligence device is determined based on data analysis and machine learning algorithms and techniques, the processor 180 may control the components of the artificial intelligence device in order to execute the determined operation. The processor 180 may control the terminal according to a control command and perform the determined operation.

When the specific operation is performed, the processor 180 may analyze historical information indicating execution of the specific operation through data analysis and machine learning algorithms and techniques and update previously learned information based on the analyzed information.

Accordingly, the processor 180 may improve accuracy of future performance of data analysis and machine learning algorithms and techniques based on the updated information, along with the learning processor 130.

The sensing unit 140 may include one or more sensors configured to sense internal information of the mobile artificial intelligence device, the surrounding environment of the mobile artificial intelligence device, user information, and the like.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation detection sensor, a thermal sensor, and a gas sensor), and a chemical sensor (for example, an electronic nose, a health care sensor, a biometric sensor, and the like). The mobile artificial intelligence device disclosed in this specification may be configured to combine and utilize information obtained from at least two sensors of such sensors.

The output unit 150 is typically configured to output various types of information, such as audio, video, tactile output, and the like. The output unit 150 may include a display 151, an audio output module 152, a haptic module 153, and a light output unit 154.

The display 151 is generally configured to display (output) information processed in the artificial intelligence device 100. For example, the display 151 may display execution screen information of an application program executed by the artificial intelligence device 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the artificial intelligence device 100 and a user, as well as function as the user input unit 123 which provides an input interface between the artificial intelligence device 100 and the user.

The audio output module 152 is generally configured to output audio data received from the wireless communication unit 110 or stored in the memory 170 in a call signal reception mode, a call mode, a record mode, a speech recognition mode, a broadcast reception mode, and the like.

The audio output module 152 may also include a receiver, a speaker, a buzzer, or the like.

A haptic module 153 can be configured to generate various tactile effects that a user feels. A typical example of a tactile effect generated by the haptic module 153 is vibration.

A light output unit 154 may output a signal for indicating event generation using light of a light source of the artificial intelligence device 100. Examples of events generated in the artificial intelligence device 100 may include message reception, call signal reception, a missed call, an alarm, a schedule notice, email reception, information reception through an application, and the like.

The interface 160 serves as an interface with external devices to be connected with the artificial intelligence device 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The artificial intelligence device 100 may perform appropriate control related to the connected external device in correspondence with connection of the external device to the interface 160.

The identification module may be a chip that stores a variety of information for granting use authority of the artificial intelligence device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the artificial intelligence device 100 via the interface 160.

The memory 170 stores data supporting various functions of the artificial intelligence device 100.

The memory 170 may store a plurality of application programs or applications executed in the artificial intelligence device 100, data and commands for operation of the artificial intelligence device 100, and data for operation of the learning processor 130 (e.g., at least one piece of algorithm information for machine learning).

The processor 180 generally controls overall operation of the artificial intelligence device 100, in addition to operation related to the application program. The processor 180 may process signals, data, information, etc. input or output through the above-described components or execute the application program stored in the memory 170, thereby processing or providing appropriate information or functions to the user.

In addition, the processor 180 may control at least some of the components described with reference to FIG. 1 in order to execute the application program stored in the memory 170. Further, the processor 180 may operate a combination of at least two of the components included in the artificial intelligence device 100, in order to execute the application program.

The power supply 190 receives external power or internal power and supplies the appropriate power required to operate respective components included in the artificial intelligence device 100, under control of the controller 180. The power supply 190 may include a battery, and the battery may be a built-in or rechargeable battery.

Meanwhile, as described above, the processor 180 controls operation related to the application program and overall operation of the artificial intelligence device 100. For example, the processor 180 may execute or release a lock function for limiting input of a control command of the user to applications when the state of the mobile artificial intelligence device satisfies a set condition.

Figure 2:
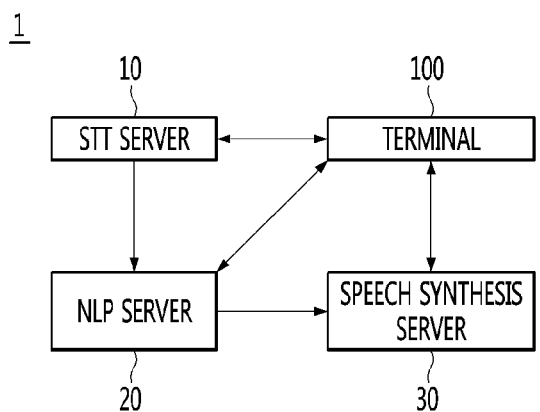
FIG. 2 is a diagram illustrating a speech system according to an embodiment of the present invention.

FIG. 2 is a diagram illustrating a speech system according to an embodiment of the present invention.

Referring to FIG. 2, the speech system 1 includes an artificial intelligence device 100, a speech-to-text (STT) server 10, a natural language processing (NLP) server 20 and a speech synthesis server 30.

The artificial intelligence device 100 may transmit speech data to the STT server 10.

The STT server 10 may convert the speech data received from the artificial intelligence device 100 into text data.

The STT server 10 may increase accuracy of speech-text conversion using a language model.

The language model may mean a model capable of calculating a probability of a sentence or a probability of outputting a next word is output when previous words are given.

For example, the language model may include probabilistic language models such as a unigram model, a bigram model, an N-gram model, etc.

The unigram model refers to a model that assumes that use of all words is completely independent of each other and calculates the probability of a word string by a product of the probabilities of words.

The bigram model refers to a model that assumes that use of words depends on only one previous word.

The N-gram model refers to a model that assumes that use of words depends on (n−1) previous words.

That is, the STT server 10 may determine when the speech data is appropriately converted into the text data using the language model, thereby increasing accuracy of conversion into the text data.

The NLP server 20 may receive the text data from the STT server 10. The NLP server 20 may analyze the intention of the text data based on the received text data.

The NLP server 20 may transmit intention analysis information indicating the result of performing intention analysis to the artificial intelligence device 100.

The NLP server 20 may sequentially perform a morpheme analysis step, a syntax analysis step, a speech-act analysis step, a dialog processing step with respect to text data, thereby generating intention analysis information.

The morpheme analysis step refers to a step of classifying the text data corresponding to the speech uttered by the user into morphemes as a smallest unit having a meaning and determining the part of speech of each of the classified morphemes.

The syntax analysis step refers to a step of classifying the text data into a noun phrase, a verb phrase, an adjective phrase, etc. using the result of the morpheme analysis step and determines a relation between the classified phrases.

Through the syntax analysis step, the subject, object and modifier of the speech uttered by the user may be determined.

The speech-act analysis step refers to a step of analyzing the intention of the speech uttered by the user using the result of the syntax analysis step. Specifically, the speech-act step refers to a step of determining the intention of a sentence such as whether the user asks a question, makes a request, or expresses simple emotion.

The dialog processing step refers to a step of determining whether to answer the user's utterance, respond to the user's utterance or question about more information.

The NLP server 20 may generate intention analysis information including at least one of the answer to, a response to, or a question about more information on the intention of the user's utterance, after the dialog processing step.

Meanwhile, the NLP server 20 may receive the text data from the artificial intelligence device 100. For example, when the artificial intelligence device 100 supports the speech-to-text conversion function, the artificial intelligence device 100 may convert the speech data into the text data and transmit the converted text data to the NLP server 20.

The speech synthesis server 30 may synthesize prestored speech data to generate a synthesized speech.

The speech synthesis server 30 may record the speech of the user selected as a model and divide the recorded speech into syllables or words. The speech synthesis server 30 may store the divided speech in an internal or external database in syllable or word units.

The speech synthesis server 30 may retrieve syllables or words corresponding to the given text data from the database and synthesize the retrieved syllables or words, thereby generating the synthesized speech.

The speech synthesis server 30 may store a plurality of speech language groups respectively corresponding to a plurality of languages.

For example, the speech synthesis server 30 may include a first speech language group recorded in Korean and a second speech language group recorded in English.

The speech synthesis server 30 may translate text data of a first language into text of a second language and generate a synthesized speech corresponding to the translated text of the second language using the second speech language group.

The speech synthesis server 30 may transmit the synthesized speech to the artificial intelligence device 100.

The speech synthesis server 30 may receive the intention analysis information from the NLP server 20.

The speech synthesis server 30 may generate the synthesized speech including the intention of the user based on the intention analysis information.

In one embodiment, the STT server 10, the NLP server 20 and the speech synthesis server 30 may be implemented as one server.

The respective functions of the STT server 10, the NLP server 20 and the speech synthesis server 30 may also be performed in the artificial intelligence device 100. To this end, the artificial intelligence device 100 may include a plurality of processors.

Figure 3:
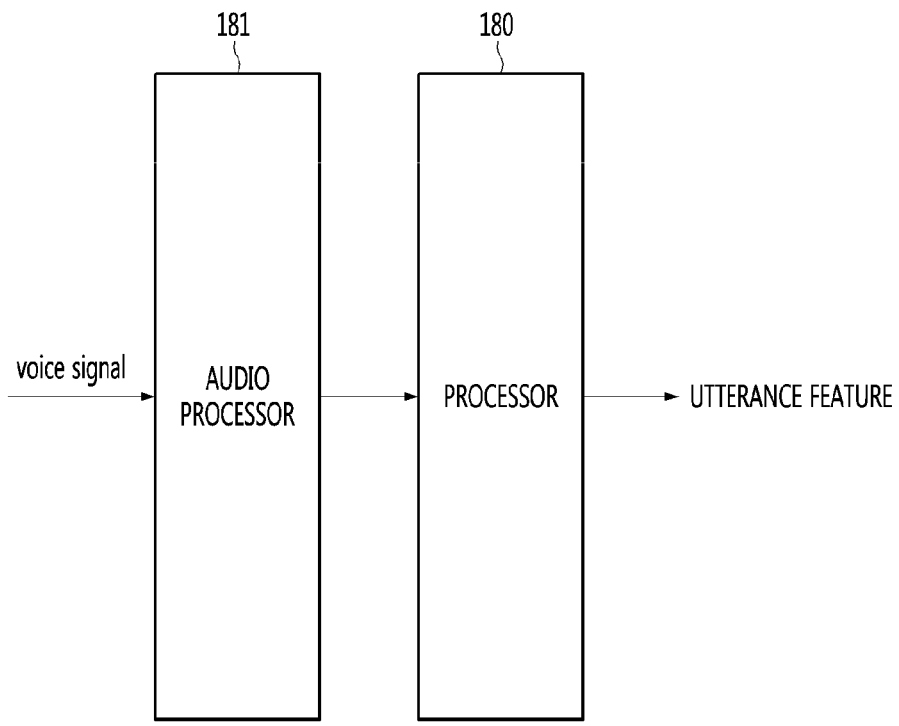
FIG. 3 is a diagram illustrating a process of extracting utterance features of a user from a speech signal according to an embodiment of the present invention.

FIG. 3 is a diagram illustrating a process of extracting utterance features of a user from a speech signal according to an embodiment of the present invention.

The artificial intelligence device 100 shown in FIG. 1 may further include an audio processor 181.

The audio processor 181 may be implemented as a chip separated from the processor 180 or a chip included in the processor 180.

The audio processor 181 may remove noise from the speech signal.

The audio processor 181 may convert the speech signal into text data. To this end, the audio processor 181 may include an STT engine.

The audio processor 181 may recognize a wake-up word for activating speech recognition of the artificial intelligence device 100. The audio processor 181 may convert the wake-up word received through the microphone 122 into text data and determine that the wake-up word is recognized when the converted text data corresponds to the prestored wake-up word.

The audio processor 181 may convert the speech signal, from which noise is removed, into a power spectrum.

The power spectrum may be a parameter indicating a frequency component included in the waveform of the speech signal varying with time, and a magnitude thereof.

The power spectrum shows a distribution of an amplitude squared value according to the frequency of the waveform of the speech signal.

This will be described with reference to FIG. 4.

Figure 4:
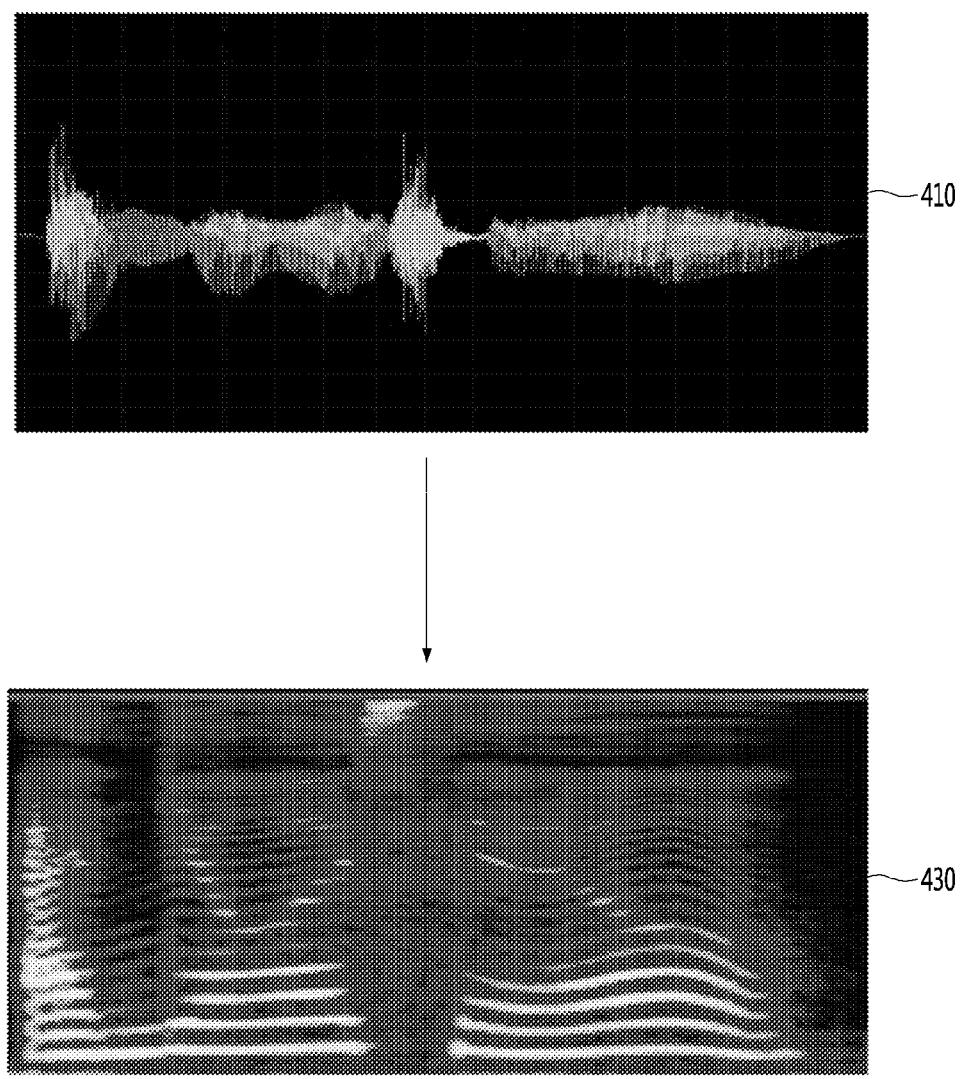
FIG. 4 is a diagram illustrating an example of converting a speech signal into a power spectrum according to an embodiment of the present invention.

FIG. 4 is a diagram illustrating an example of converting a speech signal into a power spectrum according to an embodiment of the present invention.

Referring to FIG. 4, the speech signal 410 is shown. The speech signal 410 may be received through the microphone 122 or prestored in the memory 170.

The x-axis of the speech signal 410 denotes a time and the y-axis denotes an amplitude.

The audio processor 181 may convert the speech signal 410, the x-axis of which is a time axis, into a power spectrum 430, the x-axis of which is a frequency axis.

The audio processor 181 may convert the speech signal 410 into the power spectrum 430 using Fast Fourier transform (FFT).

The x-axis of the power spectrum 430 denotes a frequency and the y-axis of the power spectrum 430 denotes a squared value of an amplitude.

FIG. 3 will be described again.

The processor 180 may determine utterance features of a user using at least one of the power spectrum 430 or the text data received from the audio processor 181.

The utterance features of the user may include the gender of the user, the pitch of the user, the tone of the user, the topic uttered by the user, the utterance speed of the user, the volume of the user's voice, etc.

The processor 180 may acquire the frequency of the speech signal 410 and the amplitude corresponding to the frequency using the power spectrum 430.

The processor 180 may determine the gender of the user who utters a speech, using the frequency band of the power spectrum 430.

For example, the processor 180 may determine the gender of the user as a male when the frequency band of the power spectrum 430 is within a predetermined first frequency band range.

The processor 180 may determine the gender of the user as a female when the frequency band of the power spectrum 430 is within a predetermined second frequency band range. Here, the second frequency band range may be larger than the first frequency band range.

The processor 180 may determine the pitch of the speech using the frequency band of the power spectrum 430.

For example, the processor 180 may determine the pitch of the speech according to the amplitude within a specific frequency band range.

The processor 180 may determine the tone of the user using the frequency band of the power spectrum 430. For example, the processor 180 may determine a frequency band having a certain amplitude or more among the frequency bands of the power spectrum 430 as a main register of the user and determines the determined main register as the tone of the user.

The processor 180 may determine the utterance speed of the user through the number of syllables uttered per unit time from the converted text data.

The processor 180 may determine the topic uttered by the user using a Bag-Of-Word Model scheme with respect to the converted text data.

The Bag-Of-Word Model scheme refers to a scheme for extracting mainly used words based on the frequency of words in a sentence. Specifically, the Bag-Of-Word Model scheme refers to a scheme for extracting unique words from a sentence, expressing the frequency of the extracted words by a vector and determining the uttered topic as a feature.

For example, when words <running>, <physical strength>, etc. frequently appears in the text data, the processor 180 may classify the topic uttered by the user into an exercise.

The processor 180 may determine the topic uttered by the user from the text data using a known text categorization scheme. The processor 180 may extract keywords from the text data and determine the topic uttered by the user.

The processor 180 may determine the volume of user's voice in consideration of the amplitude information in an entire frequency band.

For example, the processor 180 may determine the volume of user's voice based on an average or weighted average of amplitudes in each frequency band of the power spectrum.

The functions of the audio processor 181 and the processor 180 described with reference to FIGS. 3 and 4 may be performed in any one of the NLP server 20 or the speech synthesis server 30.

For example, the NLP server 20 may extract the power spectrum using the speech signal and determine the utterance features of the user using the extracted power spectrum.

The artificial intelligence system may include an artificial intelligence device 100-1, a first external artificial intelligence device 100-2, and a second external artificial intelligence device 100-3.

Each of the artificial intelligence device 100-1, the first external artificial intelligence device 100-2, and the second external artificial intelligence device 100-3 may include all the components shown in FIG. 1.

Figure 5:
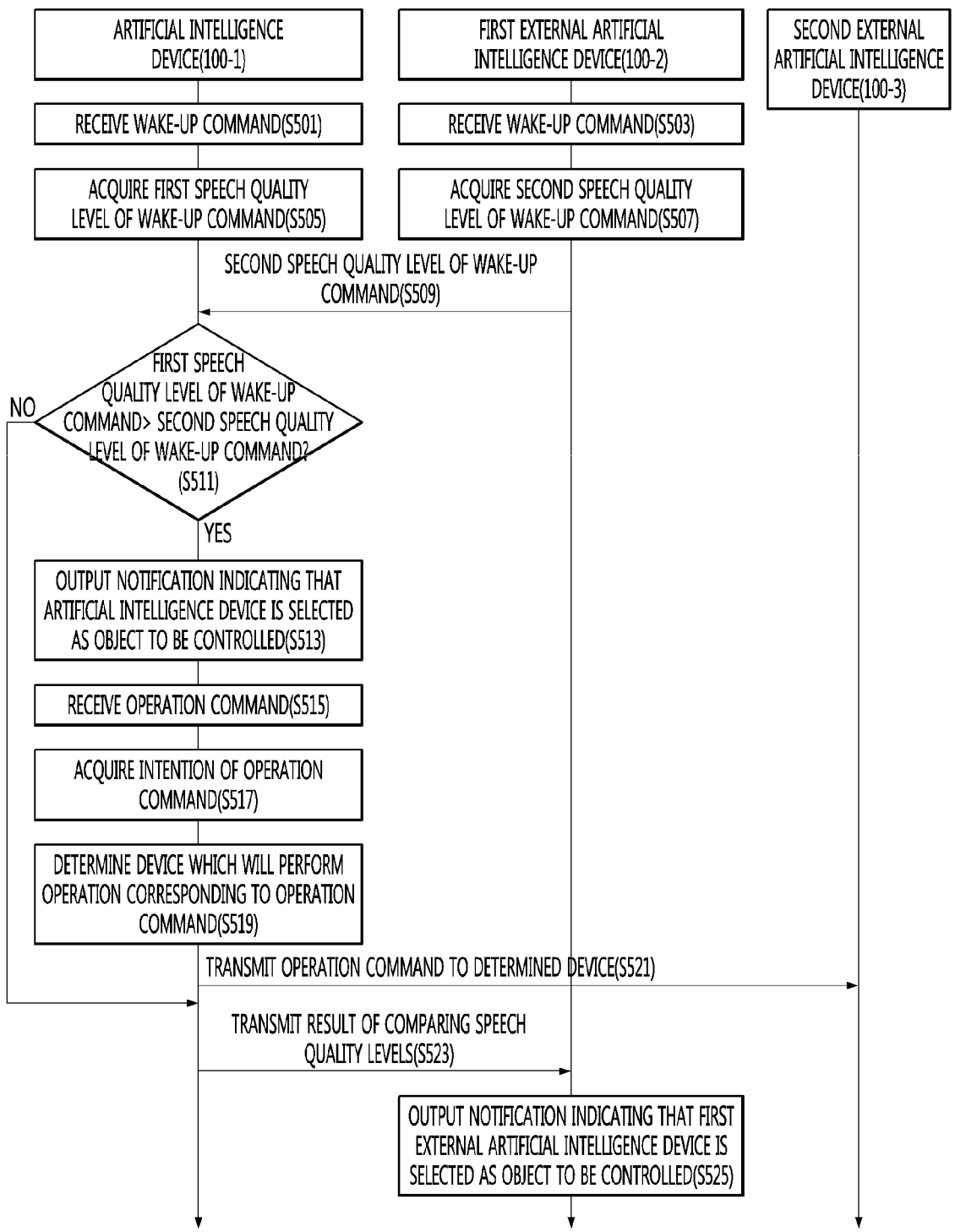
FIG. 5 is a diagram illustrating a method of operating an artificial intelligence system according to an embodiment of the present invention.

Meanwhile, although the artificial intelligence system includes three artificial intelligence devices in FIG. 5, this is merely an example and more artificial intelligence devices may be included.

The microphone 122 of the artificial intelligence device 100-1 and the microphone 122 of the first external artificial intelligence device 100-2 receive a wake-up command (S501 and S503).

In one embodiment, the wake-up command may be a speech command of the user used to activate a specific artificial intelligence device.

Although only the artificial intelligence device 100-1 and the first external artificial intelligence device 100-2 are shown as receiving the wake-up command in FIG. 5, this is merely an example and the second external artificial intelligence device 100-3 may also receive the wake-up command.

The processor 180 of the artificial intelligence device 100-1 acquires a first speech quality level of the received wake-up command (S505), and the first external artificial intelligence device 100-2 acquires a second speech quality level of the wake-up command (S507).

The processor 180 may acquire the first speech quality level indicating the speech level of the received wake-up command.

For example, the processor 180 may acquire a keyword speech to ambient noise ratio (KSANR) on the time axis as the first speech quality level.

That is, the processor 180 may measure the ratio of the power of the keyword speech to the power of ambient noise on the time axis with respect to the received wake-up command and acquire the measured ratio as the first speech quality level.

In another example, the processor 180 may measure a ratio of a signal of a keyword speech section to a signal of a noise section (signal to noise ratio (SNR)) in the frequency domain and acquire the measured ratio as the first speech quality level.

That is, the processor 180 may acquire a signal to noise ratio of a keyword speech section in the frequency domain as the first speech quality level, with respect to the received wake-up command.

Similarly, the processor 180 of the first external artificial intelligence device 100-2 may acquire any one of the KSANR or SNR of the received wake-up command as the second speech quality level.

Meanwhile, the processor 180 may extract a keyword speech, speech noise and ambient noise from the wake-up command. The processor 180 may measure a speech quality level such as the KSANR or the SNR using the result of extraction.

In another example, the speech quality level may indicate whether the volume of the wake-up command is within an appropriate range.

For example, when the volume of the wake-up command received by the artificial intelligence device 100-1 is within the appropriate range and the volume of the wake-up command received by the first external artificial intelligence device 100-2 is not within the appropriate range, it may be determined that the first speech quality level of the wake-up command received by the artificial intelligence device 100-1 is larger than the second speech quality level of the wake-up command received by the first external artificial intelligence device 100-2.

In this case, the speech quality level may include the volume of the wake-up command received by the external artificial intelligence device or information indicating whether the volume of the wake-up command is within the appropriate range.

Figure 6:
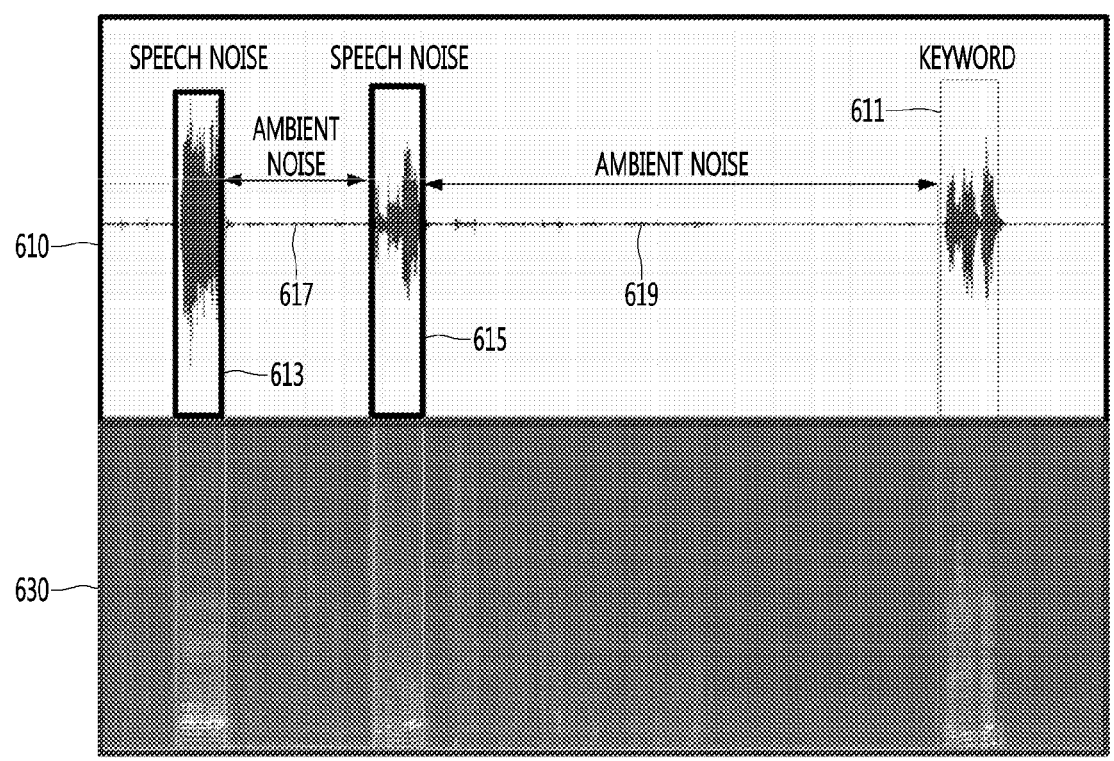
FIG. 6 is a diagram illustrating an example of measuring a speech quality level according to an embodiment of the present invention.

Referring to FIG. 6, a speech signal 610 corresponding to the wake-up command input through the microphone 122 and the power spectrum 430 of the speech signal 610 are shown.

The audio processor 181 may extract a keyword speech 611, speech noises 613 and 615 and ambient noises 617 and 619 from the speech signal 610.

When a speech pattern of a specific section of the speech signal 610 matches a predetermined noise pattern by a certain ratio or more, the audio processor 181 may classify the section into the speech noise.

Similarly, when a speech pattern of a specific section of the speech signal 610 matches a predetermined ambient noise pattern by a certain ratio or more, the audio processor 181 may classify the section into the ambient noise.

The audio processor 181 may determine a section excluding the speech noise and the ambient noise from the speech signal 610 as the keyword speech.

The audio processor 181 or the processor 180 may acquire the speech quality level using the keyword speech 611, the speech noises 613 and 615 and the ambient noises 617 and 619 extracted from the speech signal 610.

For example, the audio processor 181 or the processor 180 may measure the ratio of the power corresponding to the keyword speech 611 to the power corresponding to the ambient noises 617 and 619 and acquire the measured ratio as the speech quality level. Here, the power may be an amplitude or power calculated through the amplitude.

In another example, the audio processor 181 or the processor 180 may measure the ratio of the power of the power spectrum corresponding to the keyword speech 611 to the power of the power spectrum corresponding to the noises 613, 615, 617 and 619 and acquire the measured ratio as the speech quality level.

FIG. 5 will be described again.

The processor 180 of the artificial intelligence device 100-1 receives the second speech quality level from the first external artificial intelligence device 100-2 through the wireless communication unit 110 (S509).

The processor 180 may receive the second speech quality level from the first external artificial intelligence device 100-2 through the short-range communication module 114.

The processor 180 of the artificial intelligence device 100-1 compares the first speech quality level with the second speech quality level and determines whether the first speech quality level is larger than the second speech quality level (S511).

In one embodiment, the processor 180 may determine which of the KSANR of the wake-up command received by the artificial intelligence device 100-1 and the KSANR of the wake-up command received by the first external artificial intelligence device 100-2 is larger through comparison.

When the KSANR of the wake-up command received by the artificial intelligence device 100-1 is larger than the KSANR of the wake-up command received by the first external artificial intelligence device 100-2, the processor 180 may determine that the first speech quality level is larger than the second speech quality level.

In contrast, when the KSANR of the wake-up command received by the artificial intelligence device 100-1 is smaller than the KSANR of the wake-up command received by the first external artificial intelligence device 100-2, the processor 180 may determine that the first speech quality level is smaller than the second speech quality level.

In another example, the processor 180 may determine which of the SNR of the wake-up command received by the artificial intelligence device 100-1 and the SNR of the wake-up command received by the first external artificial intelligence device 100-2 is larger through comparison.

When the SNR of the wake-up command received by the artificial intelligence device 100-1 is larger than the SNR of the wake-up command received by the first external artificial intelligence device 100-2, the processor 180 may determine that the first speech quality level is larger than the second speech quality level.

In contrast, the SNR of the wake-up command received by the artificial intelligence device 100-1 is smaller than the SNR of the wake-up command received by the first external artificial intelligence device 100-2, the processor 180 may determine that the first speech quality level is smaller than the second speech quality level.

When the first speech quality level is larger than the second speech quality level, the processor 180 of the artificial intelligence device 100-1 outputs a notification indicating that the artificial intelligence device 100-1 is selected as an object to be controlled (S513).

When the first speech quality level is larger than the second speech quality level, the processor 180 may output a notification indicating that the artificial intelligence device 100-1 is selected according to the wake-up command of the user.

That is, a notification that the artificial intelligence device 100-1 has been activated according to the wake-up command may be output.

The processor 180 may audibly output the notification through the sound output unit 152 or output specific light through the light output unit 154.

The processor 180 may output specific light while audibly outputting the notification.

Thereafter, the microphone 122 of the artificial intelligence device 100-1 receives an operation command (S515), and the processor 180 acquires the intention of the received operation command (S517).

For example, the processor 180 may convert the operation command into text and transmit the converted text to the NLP server 20 shown in FIG. 2.

The processor 180 may receive an intention analysis result of the NLP server 20 from the NLP server 20.

The intention analysis result may include an artificial intelligence device which will perform the operation command and operation which will be performed by the external artificial intelligence device.

In another example, the processor 180 may autonomously acquire the intention of the operation command.

The processor 180 may include a natural language processing engine capable of performing the function of the NLP server 20 and analyze the intention of the operation command using the natural language processing engine.

The processor 180 of the artificial intelligence device 100-1 determines a device which will perform operation corresponding to the operation command based on the acquired intention (S519).

The processor 180 may determine a device capable of performing operation according to the acquired intention among the plurality of external artificial intelligence devices. Each of the plurality of external artificial intelligence devices may be a device connected to the artificial intelligence device 100-1 or a connectable device.

The processor 180 may select a device capable of performing operation according to the acquired intention from among the artificial intelligence device 100-1, the first external artificial intelligence device 100-2 and the second external artificial intelligence device 100-3.

The processor 180 of the artificial intelligence device 100-1 transmits the operation command to the determined second external artificial intelligence device 100-2 through the wireless communication unit 110 (S521).

The second external artificial intelligence device 100-2 may receive the operation command from the artificial intelligence device 100-1 and perform operation corresponding to the received operation command.

Meanwhile, upon determining that the first speech quality level is smaller than the second speech quality level, the processor 180 of the artificial intelligence device 100-1 transmits the result of comparing the speech quality levels to the first external artificial intelligence device 100-2 (S523).

The result of comparing the speech quality levels may include information indicating which of the first speech quality level and the second speech quality level is larger.

The processor 180 may transmit, to the first external artificial intelligence device 100-2, a message indicating that the first external artificial intelligence device 100-2 is selected as a device to be controlled according to utterance of the user, in addition to the result of comparing the speech quality levels.

When the first speech quality level is smaller than the second speech quality level, the artificial intelligence device 100-1 may not be activated and may be maintained in a deactivation state according to reception of the wake-up command.

The first external artificial intelligence device 100-2 outputs a notification indicating that the first external artificial intelligence device 100-2 is selected as an object to be controlled based on the received result of comparing the speech quality level (S525).

Figure 7:
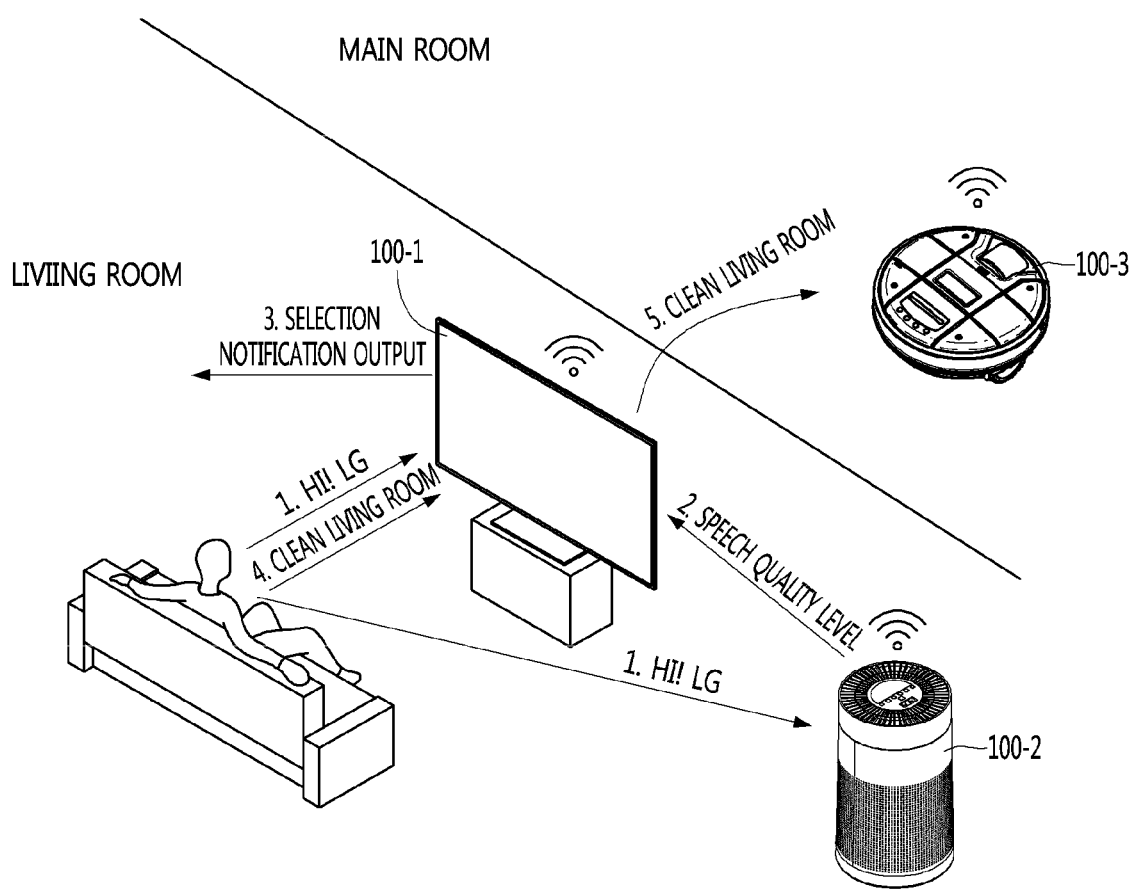
FIG. 7 is a diagram illustrating an actual use scenario of the method of operating the artificial intelligence system shown in FIG. 5.
Figure 8:
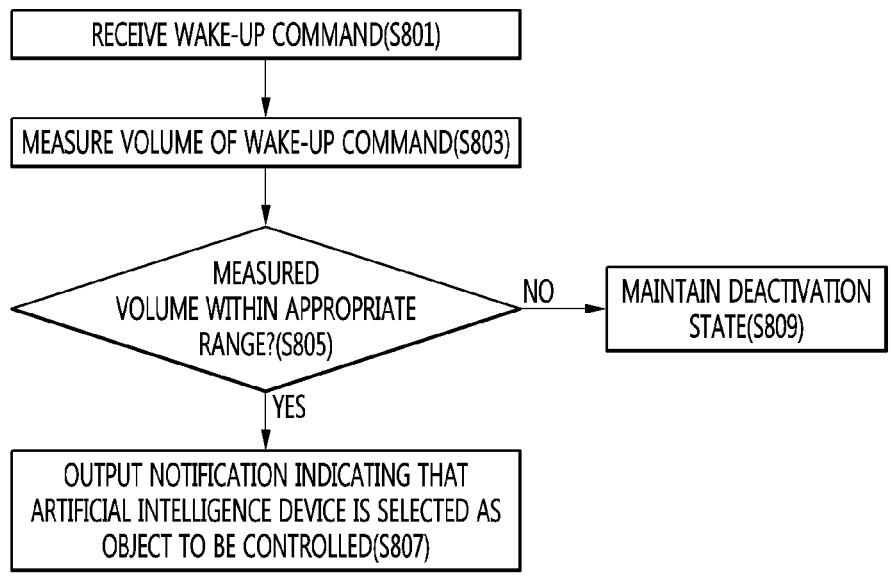
FIG. 8 is a flowchart illustrating a method of operating an artificial intelligence device according to an embodiment of the present invention.

Referring to FIG. 7, assume that the artificial intelligence device 100-1 is a smart TV, the first external artificial intelligence device 100-2 is an air cleaner, and the second external artificial intelligence device 100-3 is a robot cleaner.

In addition, the artificial intelligence device 100-1 and the first external artificial intelligence device 100-2 are located in a living room and the second external artificial intelligence device 100-3 is located in a main room.

Assume that the second external artificial intelligence device 100-3 is far from the user not to receive or recognize the speech command uttered by the user.

A user utters a wake-up command <Hi! LG>.

The artificial intelligence device 100-1 and the first external artificial intelligence device 100-2 receive the wake-up command <Hi! LG> uttered by the user.

The artificial intelligence device 100-1 may acquire the first speech quality level of the wake-up command received thereby.

In addition, the artificial intelligence device 100-1 may receive the second speech quality level of the wake-up command received by the first external artificial intelligence device 100-2 from the first external artificial intelligence device 100-2.

The artificial intelligence device 100-1 may compare the first speech quality level with the second speech quality level and output a notification that the artificial intelligence device 100-1 itself is selected as an object to be controlled when the first speech quality level is larger than the second speech quality level.

Simultaneously, the artificial intelligence device 100-1 may transmit, to the first external artificial intelligence device 100-2, a message indicating that artificial intelligence device 100-1 is selected as the object to be controlled.

The first external artificial intelligence device 100-2 may not be activated according to the message received from the artificial intelligence device 100-1, even though the wake-up command has been received from the user.

According to the embodiment of the present invention, only any one of the plurality of artificial intelligence devices activated by one wake-up command may be selected as the object to be controlled.

Therefore, it is possible to prevent a plurality of artificial intelligence devices from being activated by one wake-up command, thereby preventing confusion.

The microphone 122 of the artificial intelligence device 100 receives the wake-up command (S801).

The processor 180 of the artificial intelligence device 100 measures the volume of the received wake-up command (S803).

When the wake-up command is received through the microphone 122, the processor 180 may measure the volume of the received wake-up command.

The measured volume may be expressed in decibel, but this is only an example.

The processor 180 of the artificial intelligence device 100 determines whether the measured volume is within an appropriate range (S805).

In one embodiment, the appropriate range may be a range of a volume required for the artificial intelligence device 100 to change to the activation state according to the wake-up command.

For example, the appropriate range may be from 40 to 60, but this is merely an example.

The appropriate range may be set by the user when each artificial intelligence device is disposed in the home. That is, the appropriate range may be registered in each device according to user input.

Upon determining that the measured volume is within the appropriate range, the processor 180 of the artificial intelligence device 100 outputs a notification indicating that the artificial intelligence device 100 is selected as an object to be controlled (S807).

Upon determining that the measured volume is within the appropriate range, the processor 180 may change the deactivation state of the artificial intelligence device 100 to the activation state in response to the wake-up command.

The deactivation state of the artificial intelligence device 100 may be a state in which the artificial intelligence device 100 does not respond to the operation command uttered by the user.

The activation state of the artificial intelligence device 100 may be a state in which the artificial intelligence device 100 may perform operation corresponding to the operation command in response to the operation command uttered by the user.

Upon determining that the measured volume is within the appropriate range, the processor 180 may output a notification indicating that the artificial intelligence device 100 is selected as an object to be controlled through the sound output unit 152 or the light output unit 154.

Meanwhile, upon determining that the measured volume is not within the appropriate range, the processor 180 of the artificial intelligence device 100 maintains the deactivation state (S809).

That is, the processor 180 may not perform any operation even if the operation command uttered by the user is input to the microphone 122.

Figure 9:
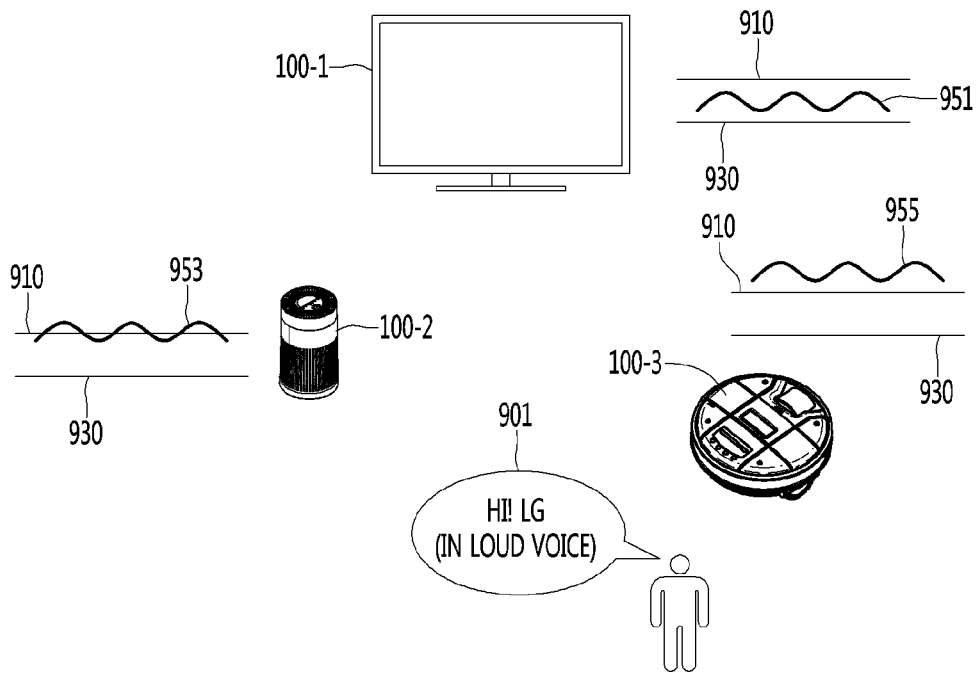
FIGS. 9 and 10 are diagrams illustrating a process of selecting any one device from among a plurality of artificial intelligence devices as an object to be controlled in response to a wake-up command of a user according to an embodiment of the present invention.
Figure 10:
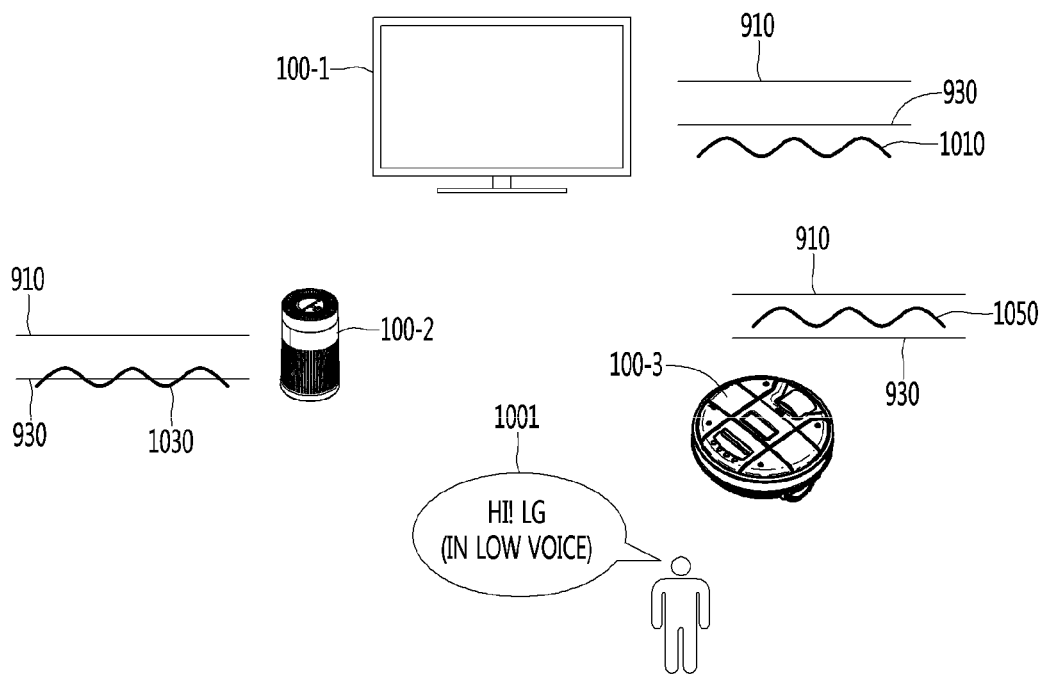

Referring to FIGS. 9 and 10, the artificial intelligence device 100-1, the first external artificial intelligence device 100-2 and the second external artificial intelligence device 100-3 are disposed.

Assume that the appropriate ranges of the volumes set to change the artificial intelligence device 100-1, the first external artificial intelligence device 100-2 and the second external artificial intelligence device 100-3 to the activation state according to the wake-up command are equally from 40 to 60.

The appropriate range may be a range from an upper limit value 910 to a lower limit value.

In addition, assume that a distance between the user and the artificial intelligence device 100-1 is larger than a second distance between the user and the first external artificial intelligence device 100-2 and a third distance between the user and the second external artificial intelligence device 100-3 is smaller than the second distance.

First, referring to FIG. 9, the user utters a wake-up command 901<Hi! LG> in a loud voice.

The artificial intelligence device 100-1 may determine whether the volume of a first speech signal 951 of the wake-up command 901 input through the microphone 122 is between the upper limit value 910 and the lower limit value 930.

As shown in FIG. 9, when the volume of the first speech signal 951 of the wake-up command 901 is between the upper limit value 910 and the lower limit value 930, the artificial intelligence device 100-1 may be selected as an object to be controlled by the wake-up command 901.

That is, the artificial intelligence device 100-1 may be activated according to the wake-up command 901.

Since the volume of 2 the speech signal 953 input through the microphone 122 is larger than the lower limit value 830 and exceeds the upper limit value 910, the first external artificial intelligence device 100-2 may determine that the volume of the second speech signal 953 is not within the appropriate range.

That is, since the volume of the wake-up command 901 is not within the appropriate range, the first external artificial intelligence device 100-2 may not be activated even if the wake-up command 901 is input to the microphone 122.

Since the volume exceeds the upper limit value 910 in the entire range of the third the speech signal 955 of the wake-up command 901 input through the microphone 122, the second external artificial intelligence device 100-3 may determine that the volume of the third speech signal 955 is not within the appropriate range.

That is, since the volume of the wake-up command 901 is not within the appropriate range, the second external artificial intelligence device 100-3 may not be activated even if the wake-up command 901 is input to the microphone 122.

According to the embodiment of the present invention, the user may visually determine a distance from a device to be controlled and utter the wake-up command in a loud voice when the device to be controlled is far therefrom, thereby easily selecting the desired device as an object to be controlled.

Next, referring to FIG. 10, the user utters a wake-up command 1001<Hi! LG> in a low voice.

Each artificial intelligence device may determine whether the volume of the wake-up command 1001 input through the microphone is within the appropriate range.

The artificial intelligence device 100-1 may determine that the volume of the fourth speech signal 1010 is not within the appropriate range, because the volume of the fourth speech signal 1010 of the wake-up command 1001 input to the microphone 122 thereof is smaller than the lower limit value 930.

That is, the artificial intelligence device 100-1 may not be activated in response to the wake-up command 1001.

The first external artificial intelligence device 100-2 may determine that the volume of the fifth speech signal 1030 is not within the appropriate range, because the volume of the fifth speech signal 1030 of the wake-up command 1001 input to the microphone 122 thereof is smaller than the lower limit value 930.

That is, the first external artificial intelligence device 100-2 may not be activated in response to the wake-up command 1001.

The second external artificial intelligence device 100-3 may be selected as an object to be controlled by the wake-up command 1001, because the volume of the sixth speech signal 1050 of the wake-up command 1001 input to the microphone 122 thereof is within the appropriate range in the entire range.

According to the embodiment of the present invention, the user may visually determine a distance from a device to be controlled and utter the wake-up command in a low voice when the device to be controlled is close thereto, thereby easily selecting the desired device as an object to be controlled.

In addition, in the embodiments of FIGS. 9 and 10, since only any one device is activated according to utterance of the same wake-up command, it is possible to prevent a plurality of devices from being activated, thereby preventing congestion.

Figure 11:
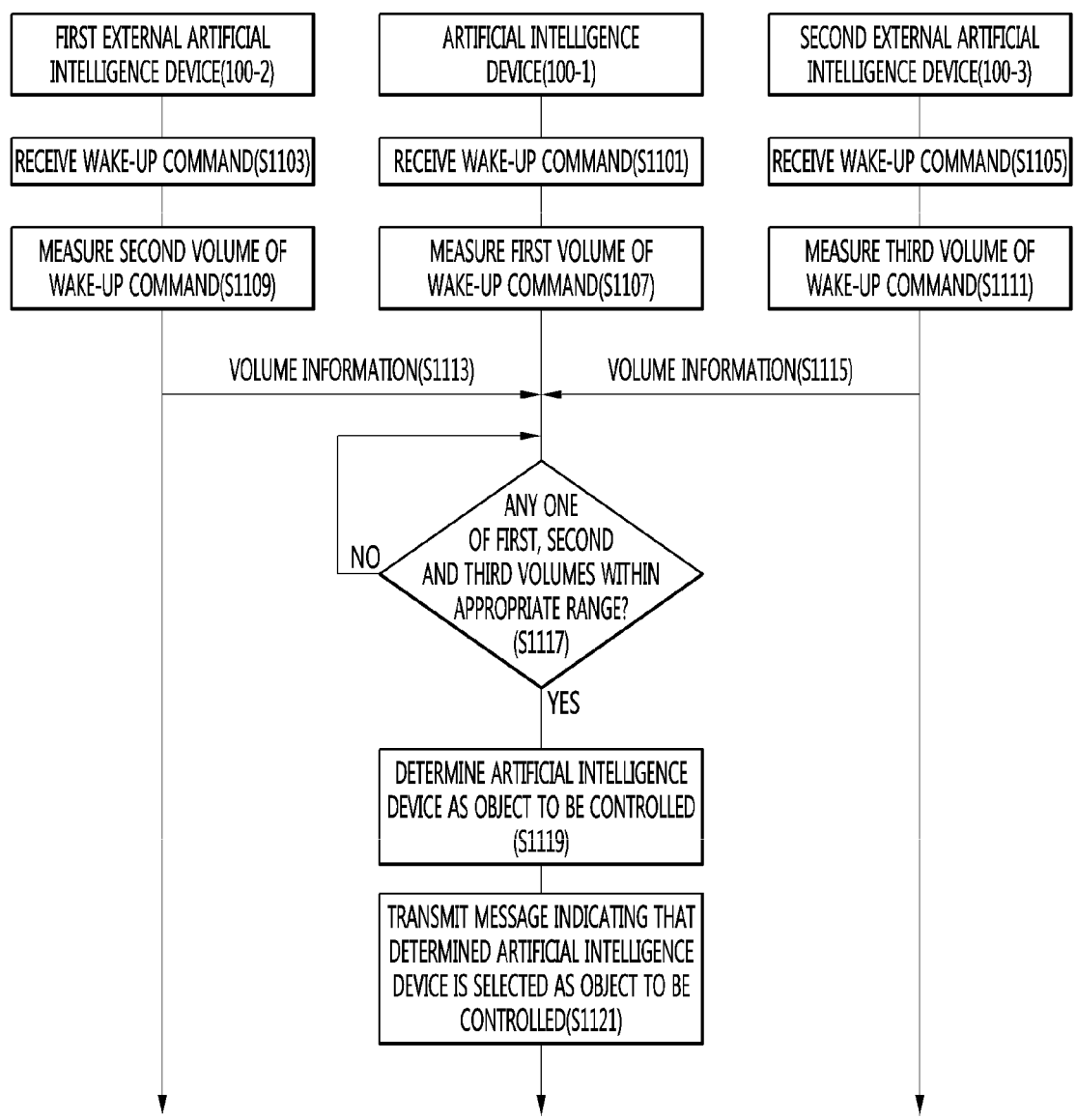
FIG. 11 is a ladder diagram illustrating a method of operating an artificial intelligence system according to another embodiment of the present invention.

In particular, FIG. 11 is a diagram illustrating an example in which any one of a plurality of artificial intelligence devices becomes a master device to select an object to be controlled according to the wake-up command.

Referring to FIG. 11, each of the artificial intelligence device 100-1, the first external artificial intelligence device 100-2 and the second external artificial intelligence device 100-3 receives the wake-up command through the microphone 122 (S1101, S1103 and S1105).

The processor 180 of the artificial intelligence device 100-1 measures the first volume of the wake-up command (S1107), the first external artificial intelligence device 100-2 measures the second volume of the wake-up command (S1109), and the second external artificial intelligence device 100-3 measures the third volume of the wake-up command (S1111).

The processor 180 of the artificial intelligence device 100-1 receives the volume information including the second volume from the first external artificial intelligence device 100-2 through the wireless communication unit 110 (S1113), and receives the volume information including the third volume from the second external artificial intelligence device 100-3 (S1115).

The processor 180 of the artificial intelligence device 100-1 determines whether any one of the first volume, the second volume and the third volume is within the appropriate range (S1117).

When any one volume is within the appropriate range, the processor 180 of the artificial intelligence device 100-1 determines a device corresponding to the volume as an object to be controlled (S1119).

The processor 180 of the artificial intelligence device 100-1 transmits, to the determined device, a message indicating that the determined device is selected as an object to be controlled through the wireless communication unit 110 (S1121).

For example, when the second volume corresponding to the first external artificial intelligence device 100-2 is within the appropriate range, the processor 180 may transmit, to the first external artificial intelligence device 100-2, a message indicating the first external artificial intelligence device 100-2 is selected as the object to be controlled through the wireless communication unit 110.

The first external artificial intelligence device 100-2 may change the state thereof to the activation state according to the message received from the artificial intelligence device 100-1.

When the artificial intelligence device 100-1 is selected as an object to be controlled, the processor 180 may omit step S1121.

When the artificial intelligence device 100-1 is selected as an object to be controlled, the processor 180 may output a notification indicating this.

In the embodiment of FIG. 11, the mater device may efficiently select the object to be controlled according to utterance of the wake-up command of the user.

Meanwhile, when an obstacle is present between the user and the artificial intelligence device, the speech signal of the wake-up command may be reflected from the obstacle, thereby activating a device undesired by the user.

Accordingly, it is necessary to select the object to be controlled in consideration of the speech signal reflected by the obstacle.

Figure 12:
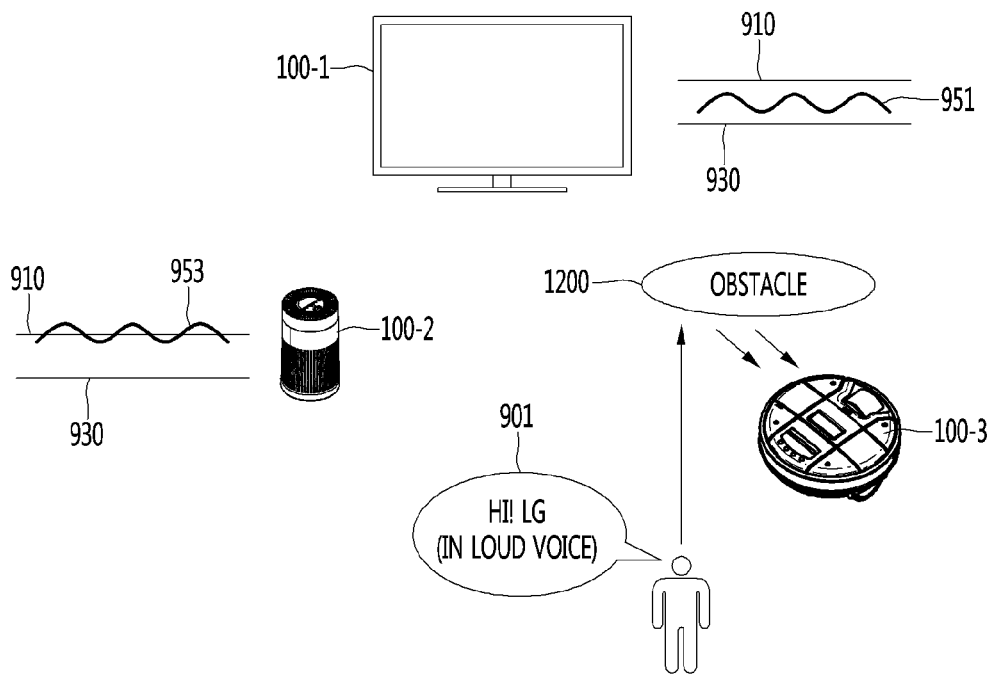
FIGS. 12 and 13 are diagrams illustrating a method of correcting the volume of a wake-up command when an obstacle is located between a user and an artificial intelligence device.
Figure 13:
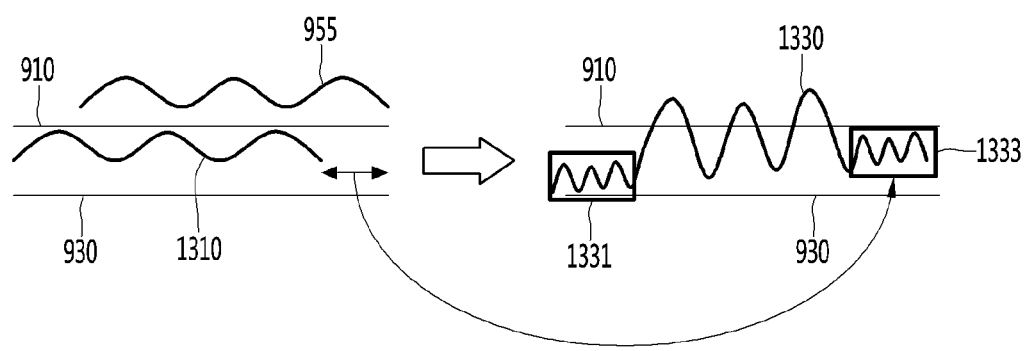

In FIG. 12, an obstacle 1200 is further disposed in the embodiment of FIG. 9.

A user utters a wake-up command 901 in a loud voice in order to select a farthest artificial intelligence device 100-1 among artificial intelligence devices.

However, due to presence of the obstacle 1200, the speech signal of the wake-up command 901 may be reflected from the obstacle and the reflected signal may be input to the second external artificial intelligence device 100-2.

That is, the speech signal 955 of the wake-up command 901 and the reflected signal 1310 generated by reflecting the speech signal 955 at the obstacle 1200 may be input to the microphone 122 of the second external artificial intelligence device 100-2.

When the reflected signal 1310 is within the appropriate range, even though the user utters the wake-up command 901 in a loud voice in order to select the artificial intelligence device 100-1, the second external artificial intelligence device 100-3 may also be activated.

When the artificial intelligence device 100-1 and the second external artificial intelligence device 100-3 are activated in response to the wake-up command 901, the two devices respond to the operation command of the user, thereby increasing confusion.

To this end, each artificial intelligence device may measure an echo time of the wake-up command 901, thereby measuring presence of the obstacle.

The echo time means a time required to reduce the volume of the speech signal received through the microphone 122 by 60 dB.

When the echo signal of the speech signal corresponding to the wake-up command 901 is equal to or larger than a predetermined time, the second external artificial intelligence device 100-3 may determine that the obstacle is detected.

The signal input to the second external artificial intelligence device 100-3 may include the speech signal 955 and the reflected signal 1310 input with a time difference after being reflected from the obstacle 1200.

When the speech signal 955 and the reflected signal 1310 are input, the echo time may generally exceed a predetermined time, due to influence of the reflected signal 1310 input with the time difference.

When the echo time is equal to or larger than the predetermined time and it is determined that the obstacle is detected, the second external artificial intelligence device 100-3 may analyze the waveform of a synthesized signal 1330 obtained by synthesizing the speech signal 955 and the reflected signal 1310.

The second external artificial intelligence device 100-3 may extract time difference signals 1331 and 1333 generated due to the time difference between the speech signal 955 and the reflected signal 1310 from the synthesized signal 1330.

The second external artificial intelligence device 100-3 may not consider the extracted time difference signals 1331 and 1333 upon determining whether the volume of the synthesized speech 1330 is within the appropriate range.

That is, the second external artificial intelligence device 100-3 may determine the extracted time difference signals 1331 and 1333 as an error signal and determine whether the volume of the remaining synthesized signal excluding the extracted time difference signals 1331 and 1333 is within the appropriate range.

Since some of the remaining synthesized signal excluding the time difference signals 1331 and 1333 exceed an upper limit value 910, the second external artificial intelligence device 100-3 may determine that the volume of the remaining synthesized signal is not within the appropriate range.

Therefore, the second external artificial intelligence device 100-3 may not be activated according to input of the wake-up command 901.

According to the embodiment of the present invention, even if an obstacle is present, the user can select a desired device to be controlled according to the volume of the wake-up command.

Meanwhile, in a state in which an object to be controlled is selected, the user may utter an operation command while moving. When the user utters the operation command while moving, the volume of the operation command received by the device may be changed and thus the volume may not be within the appropriate range.

Accordingly, in the present invention, a method of detecting movement of a user and adaptively adjusting the appropriate range of a volume is proposed.

Figure 14:
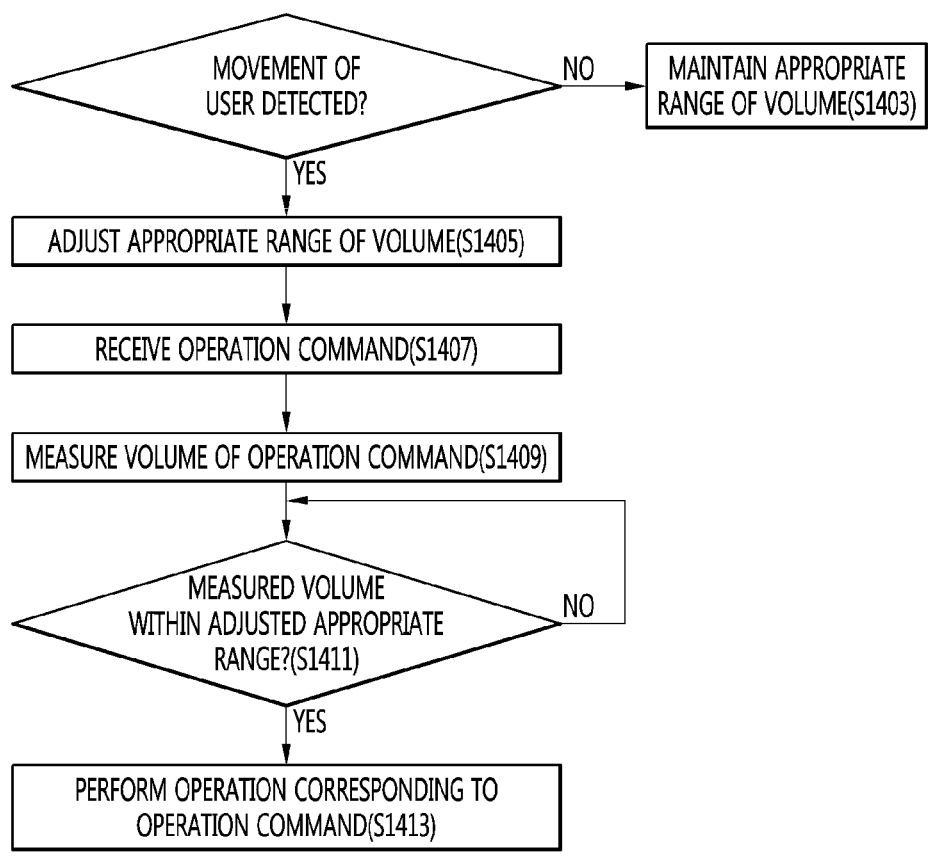
FIG. 14 is a flowchart illustrating a method of operating an artificial intelligence device according to another embodiment of the present invention.

FIG. 14 shows a process performed in a state in which a device to be controlled is selected.

Referring to FIG. 14, the processor 180 of the artificial intelligence device 100 determines whether movement of the user is detected (S1401).

For example, the artificial intelligence device 100 may detect movement of the user using one of an ultrasonic sensor, an infrared sensor or a laser sensor.

The ultrasonic sensor may emit a sound wave and repeatedly measure a time required to receive the sound wave reflected from an object.

The infrared sensor may emit an infrared ray and repeatedly measure a time required to receive the infrared ray reflected from an object.

The laser sensor may emit a laser beam and repeatedly measure a time required to receive laser beam reflected from an object.

The processor 180 may acquire a distance between the user and the artificial intelligence device 100 using the measured time. In addition, the processor 180 may acquire distance change according to change in measured time and determine whether the user is moving away from or close to the artificial intelligence device 100.

When movement of the user is not detected, the processor 180 maintains the appropriate range of the volume (S1403).

When movement of the user is detected, the processor 180 of the artificial intelligence device 100 adjusts the appropriate range of the volume (S1405).

The processor 180 may adaptively adjust the appropriate range of the volume according to the distance between the user and the artificial intelligence device 100.

When the distance between the user and the artificial intelligence device 100 increases, the processor 180 may decrease the upper limit value and the lower limit value of the appropriate range.

In contrast, when the distance between the user and the artificial intelligence device 100 decreases, the processor 180 may increase the upper limit value and the lower limit value of the appropriate range.

This will be described with reference to FIGS. 15 and 16.

Figure 15:
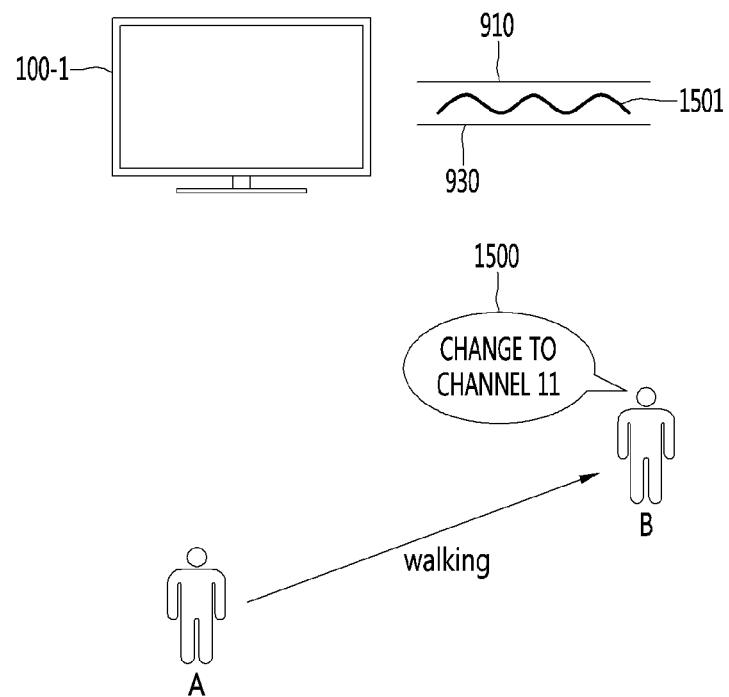
FIGS. 15 and 16 are diagrams illustrating a process of automatically adjusting an appropriate range of a volume according to user movement detection.

Referring to FIG. 15, the appropriate range (the upper limit value: 910, the lower limit value: 930) of the volume of the speech received by the artificial intelligence device 100-1 when the user is located at a position A is shown.

That is, the artificial intelligence device 100-1 may determine whether the volume of the speech signal 1501 corresponding to the received operation command is within the appropriate range, in the case where the operation command is received when the user is located at the position A.

The artificial intelligence device 100-1 may perform operation corresponding to the operation command when the volume of the speech signal 1501 is within the appropriate range.

The artificial intelligence device 100-1 may detect movement of the user from the position A to the position B.

The artificial intelligence device 100-1 may measure the distance between the user who has moved to the position B and the artificial intelligence device 100-1.

The artificial intelligence device 100-1 may adjust the appropriate range of the volume using the measured distance.

Figure 16:
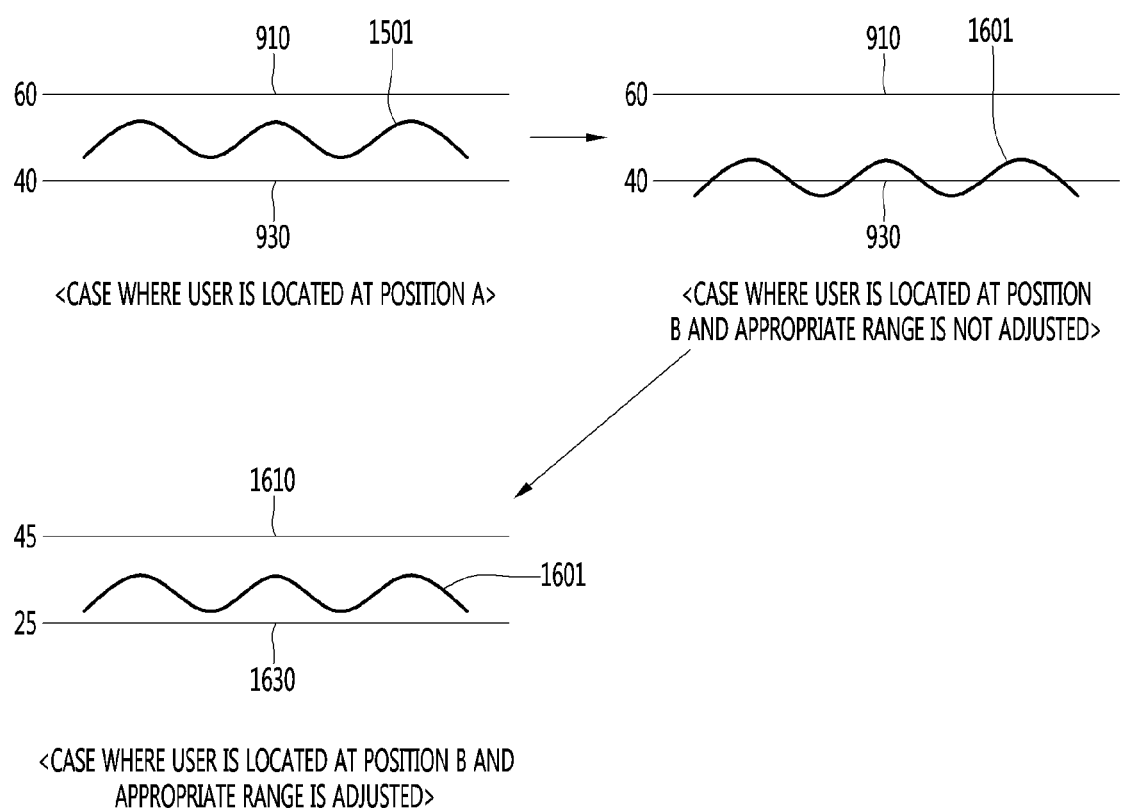

Referring to FIG. 16, when the user is located at the position A, the speech signal 1501 corresponding to the operation command is within the appropriate range. Assume that the lower limit value of the appropriate range is 40 and the upper limit value of the appropriate range is 60.

When the operation command having the same volume is received in a state in which the user has moved from the position A to the position B, since the distance between the artificial intelligence device 100-1 and the user increases, the volume of the speech signal 1601 may not be within the appropriate range.

In this case, operation of the operation command of the user may not be performed, thereby causing inconvenience.

When the user has moved to the position B, the artificial intelligence device 100-1 may measure the distance between the user and the artificial intelligence device 100-1 and adjust the upper limit value and the lower limit value of the appropriate range using the measured distance.

For example, when the measured distance is farther than an existing distance, the artificial intelligence device 100-1 may change the upper limit value from 60 to 45 and change the lower limit value from 40 to 25.

Therefore, when the user utters the operation command 1500 at the position B, the speech signal 1601 of the operation command 1500 may be within the changed appropriate range.

The artificial intelligence device 100-1 may adjust the upper limit value and the lower limit value while a difference between the upper limit value and the lower limit value is maintained.

According to the embodiment of the present invention, even if the user moves, the appropriate range of the volume may be adjusted such that the user continuously controls a desired device to be controlled.

The user may control the device to be controlled without adjusting the volume of the speech uttered thereby according to movement thereof.

FIG. 14 will be described again.

The processor 180 receives the operation command through the microphone 122 (S1407), and measures the volume of the operation command (S1409).

The processor 180 determines whether the measured volume is within the adjusted appropriate range (S1411).

When the measured volume is within the appropriate range, the processor 180 performs operation corresponding to the operation command (S1413).

Figure 17:
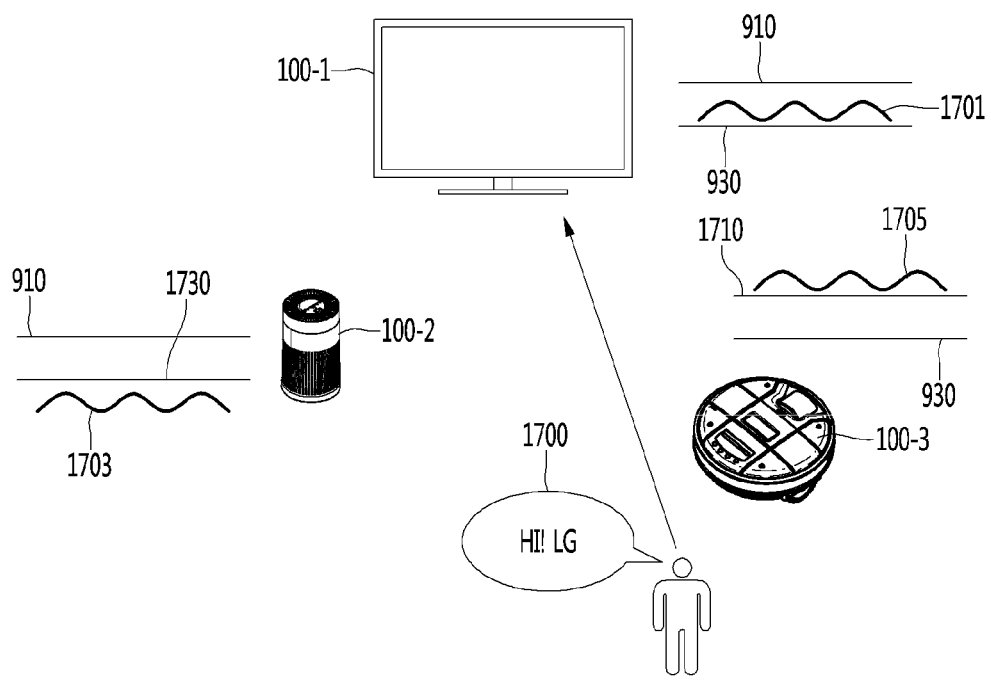
FIG. 17 is a diagram illustrating a process of registering an appropriate utterance volume range of each device when a plurality of artificial intelligence devices is disposed at fixed positions according to an embodiment of the present invention.

Referring to FIG. 17, each of the artificial intelligence device 100-1, the first external artificial intelligence device 100-2 and the second external artificial intelligence device 100-3 may be disposed at a fixed position in the home.

Assume that the distance between the user and the first external artificial intelligence device 100-2 is largest and the distance between the user and the second external artificial intelligence device 100-3 is smallest.

The user may register an appropriate utterance volume range of each device at a position where the device is fixed.

For example, assume that the user registers the appropriate utterance volume range of the artificial intelligence device 100-1.

The user utters a wake-up command 1700 having a specific volume.

The processor 180 of the artificial intelligence device 100-1 may measure the volume of the received wake-up command 1700 and set an appropriate utterance volume range corresponding to the measured volume (S1701).

The appropriate utterance volume range may have an upper limit value 910 and a lower limit value 930.

For example, when the volume of the wake-up command 1700 is 50, the processor 180 may register a range of 40 to 60, which has an upper limit value 901 of 40 and a lower limit value 930 of 60, as the appropriate utterance volume range.

Meanwhile, the first external artificial intelligence device 100-2 may set the lower limit value 1730 of the appropriate utterance volume range to be lower than 40 (S1703).

In contrast, the second external artificial intelligence device 100-3 may set the upper limit value 1710 to be lower than 60 (S1705).

When S1701, S1703 and S1705 are repeatedly performed at a specific position or another position of the user, each artificial intelligence device may register an average value of upper limit values and an average value of lower limit values as the appropriate utterance volume range.

Figure 18:
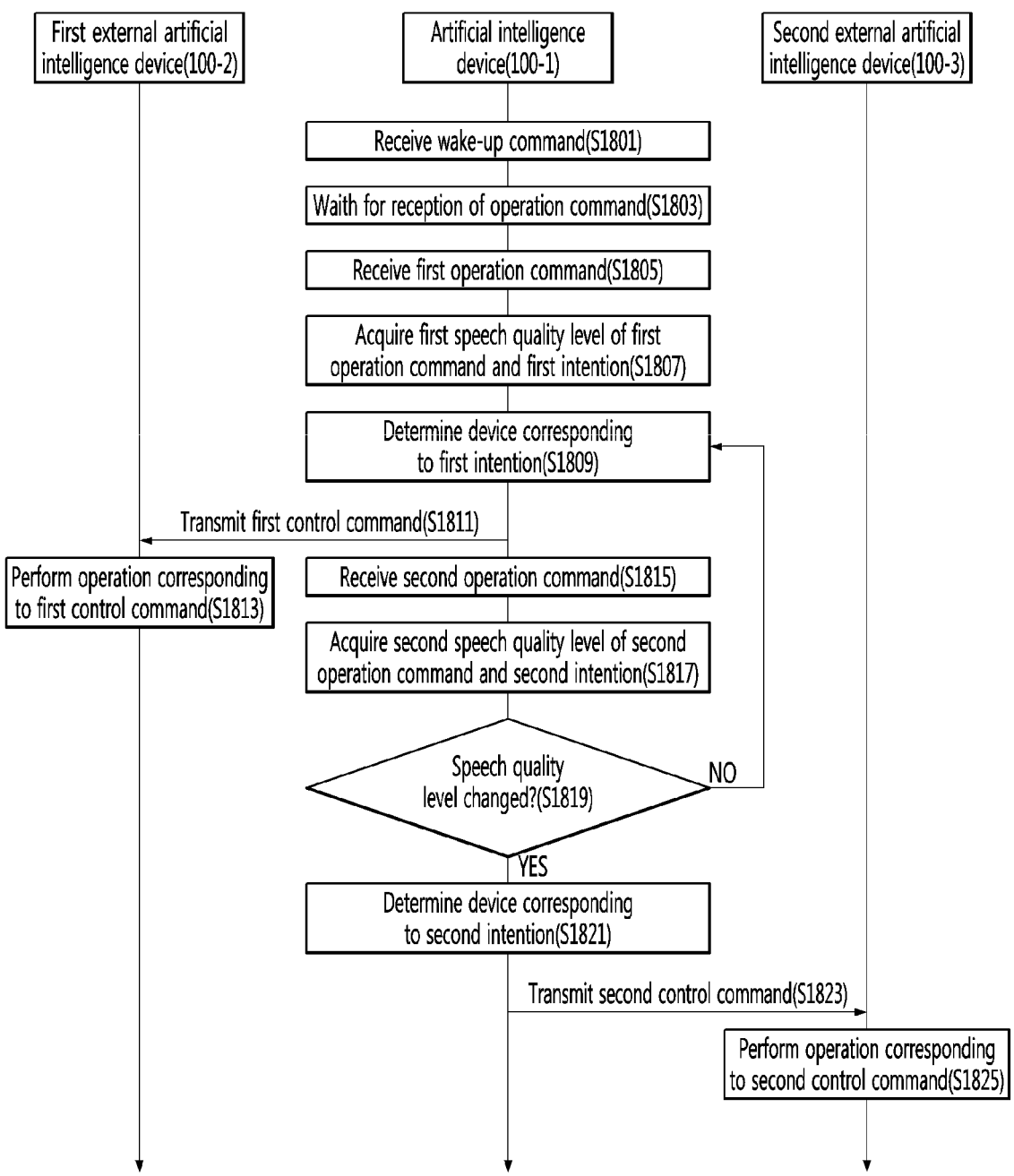
FIG. 18 is a ladder diagram illustrating a method of operating an artificial intelligence system according to another embodiment of the present invention.

In particular, FIG. 18 relates to an embodiment of analyzing the utterance intention of a user and determining a device to perform operation corresponding to the speech command of the user based on the analyzed utterance intention.

In addition, in the following embodiments, the artificial intelligence device 100-1 may control operations of the first external artificial intelligence device 100-2 and the second external artificial intelligence device 100-3, and may be a hub device capable of performing a hub function.

The hub device may receive the speech command of the user, acquire the intention of the received speech command and transmit a control command for controlling operation of another external artificial intelligence device according to the acquired intention.

In one embodiment, the hub device may be designated by the user in advance.

In another example, the hub device may be wirelessly connected to the most artificial intelligence devices among the plurality of artificial intelligence devices.

The hub device may have information on the artificial intelligence devices connected thereto.

The information on the artificial intelligence device may include identification information capable of identifying the artificial intelligence device and operation state information indicating the operation state of the artificial intelligence device.

The microphone 122 of the artificial intelligence device 100-1 receives a wake-up command (S1801).

In one embodiment, the wake-up command may be a command for activating operation of the artificial intelligence device 100-1.

The wake-up command may include the name of the artificial intelligence device 100-1 and a predetermined wake-up word.

The processor 180 of the artificial intelligence device 100-1 waits for reception of an operation command according to reception of the wake-up command (S1803).

The microphone 122 of the artificial intelligence device 100-1 receives a first operation command (S1805).

The user may utter the first operation command.

The processor 180 of the artificial intelligence device 100-1 acquires a first speech quality level indicating the quality of the received first operation command and the intention of the first operation command (S1807).

The processor 180 may acquire the first speech quality level from the speech data of the first operation command.

The speech quality level may be a keyword speech to ambient noise ratio (KSANR).

In another example, the speech quality level may be a ratio of a signal of a keyword speech section to a signal of a noise section (signal to noise ratio (SNR)).

In another example, the speech quality level may be the volume of the speech command. The volume of the speech command may indicate the level of the speech signal corresponding to the speech command.

The processor 180 may receive the intention of the first operation command from the NLP server 20 of FIG. 2.

The processor 180 may transmit the speech data of the first operation command to the NLP server 20 and receive, from the NLP server 20, the intention of the first operation command analyzed by the NLP server 20.

In another example, when the processor 180 includes a natural language processing engine, the processor 180 may acquire the intention of the first operation command using the natural language processing engine.

The first operation command may be a command for performing specific operation of the artificial intelligence device.

For the process of acquiring the speech quality level, refer to the description of FIGS. 5 and 6.

The processor 180 of the artificial intelligence device 100-1 determines a device corresponding to the acquired first intention (S1809).

In one embodiment, the processor 180 may determine an optimal device capable of performing the first intention from between the external artificial intelligence devices 100-2 and 100-3.

The processor 180 may determine a device to perform the first intention based on information on the plurality of external artificial intelligence devices 100-2 and 100-3.

The information on the external artificial intelligence device may include one or more of identification information capable of identifying the external artificial intelligence device, a name and a function of the external artificial intelligence device.

The processor 180 may determine a device suiting the first intention using the information on the plurality of external artificial intelligence devices 100-2 and 100-3.

The processor 180 of the artificial intelligence device 100-1 transmits a first control command for performing operation corresponding to the first intention to the first external artificial intelligence device 100-2 which is the determined device through the short-range communication module 114 (S1811).

The processor 180 may determine the first external artificial intelligence device 100-2 from between the first external artificial intelligence device 100-2 and the second external artificial intelligence device 100-3 as a device suiting the first intention.

The first external artificial intelligence device 100-2 performs operation corresponding to the first control command as the first control command is received (S1813).

Meanwhile, the microphone 122 of the artificial intelligence device 100-1 receives a second operation command (S1815).

The second operation command may be a command continuously uttered after the user has uttered the first operation command.

The second operation command may be a command received one second after the first operation command is received. Here, one second is merely an example.

The processor 180 of the artificial intelligence device 100-1 acquires a second speech quality level indicating the quality of the received second operation command and the intention of the second operation command (S1817).

The processor 180 may acquire the second speech quality level of the second operation command based on the speech data of the second operation command. For the process of acquiring the speech quality level, refer to the description of FIGS. 5 and 6.

In addition, the processor 180 may acquire the intention of the second operation command using the natural language processing engine or the NLP server 20.

The processor 180 of the artificial intelligence device 100-1 compares the first speech quality level with the second speech quality level to determine whether the speech quality level is changed (S1819).

When a difference between the first speech quality level and the second speech quality level is equal to or greater than a predetermined level range, the processor 180 may determine that the speech quality level is changed.

Here, the predetermined level range may be a reference range used to determine change in speech quality level.

For example, in the case where the speech quality level is a volume, the processor 180 may determine that the speech quality level is changed when a difference between the first volume of the first operation command and the second volume of the second operation command is equal to or greater than a predetermined volume range.

The processor 180 may determine that the device to be controlled are intended to be changed, when the volumes of the first operation command and the second operation command received thereafter are changed.

The processor 180 of the artificial intelligence device 100-1 determines a device corresponding to the second intention when the speech quality level is changed (S1821).

The processor 180 may determine the device to perform the second intention based on information on the plurality of artificial intelligence devices.

In the present embodiment, assume that the second external artificial intelligence device 100-3 is determined as an optimal device capable of performing the second intention.

The processor 180 of the artificial intelligence device 100-1 transmits a second control command for performing operation suiting the second intention to the determined second external artificial intelligence device 100-3 through the short-range communication module 114 (S1823).

The second external artificial intelligence device 100-3 performs operation corresponding to a second control command as the second control command is received (S1825).

Figure 19:
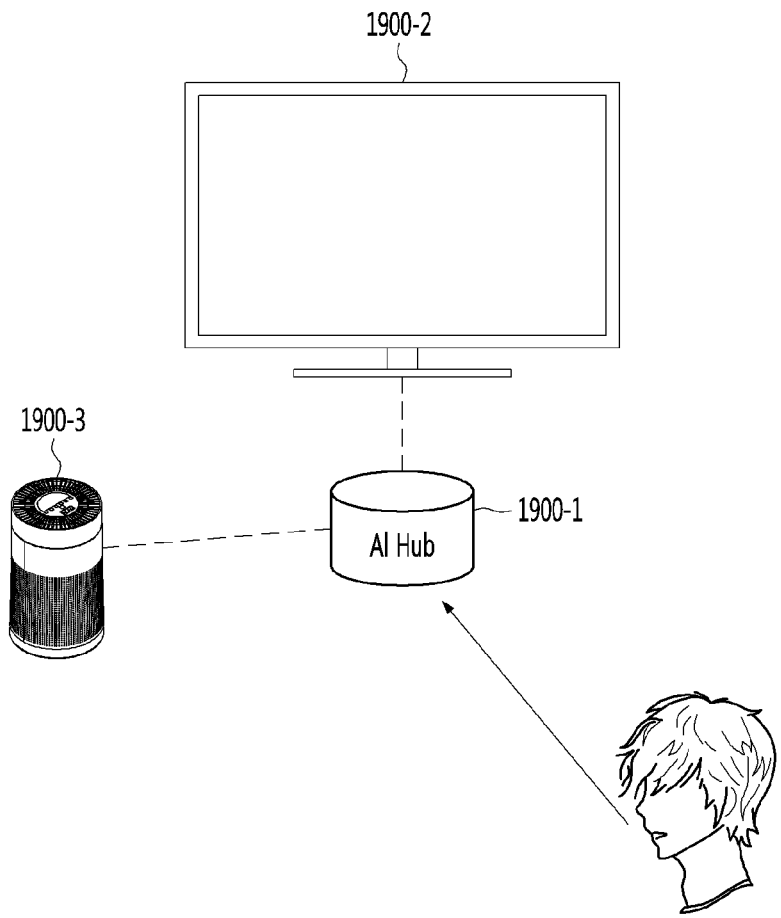
FIGS. 19 to 21 are diagrams illustrating a process of, at an AI hub device, determining a device to perform a speech command uttered by a user and transmitting a control command to the determined device according to an embodiment of the present invention.
Figure 20:
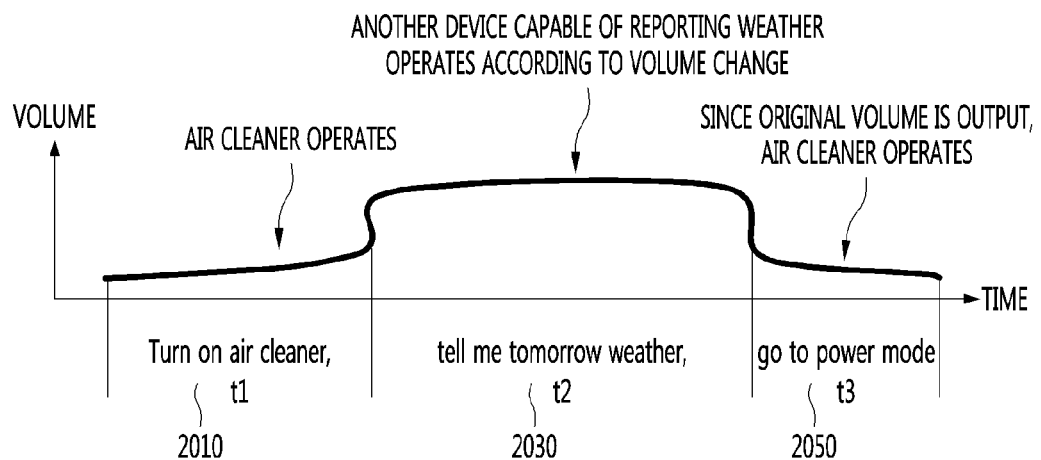
Figures 21, 22:
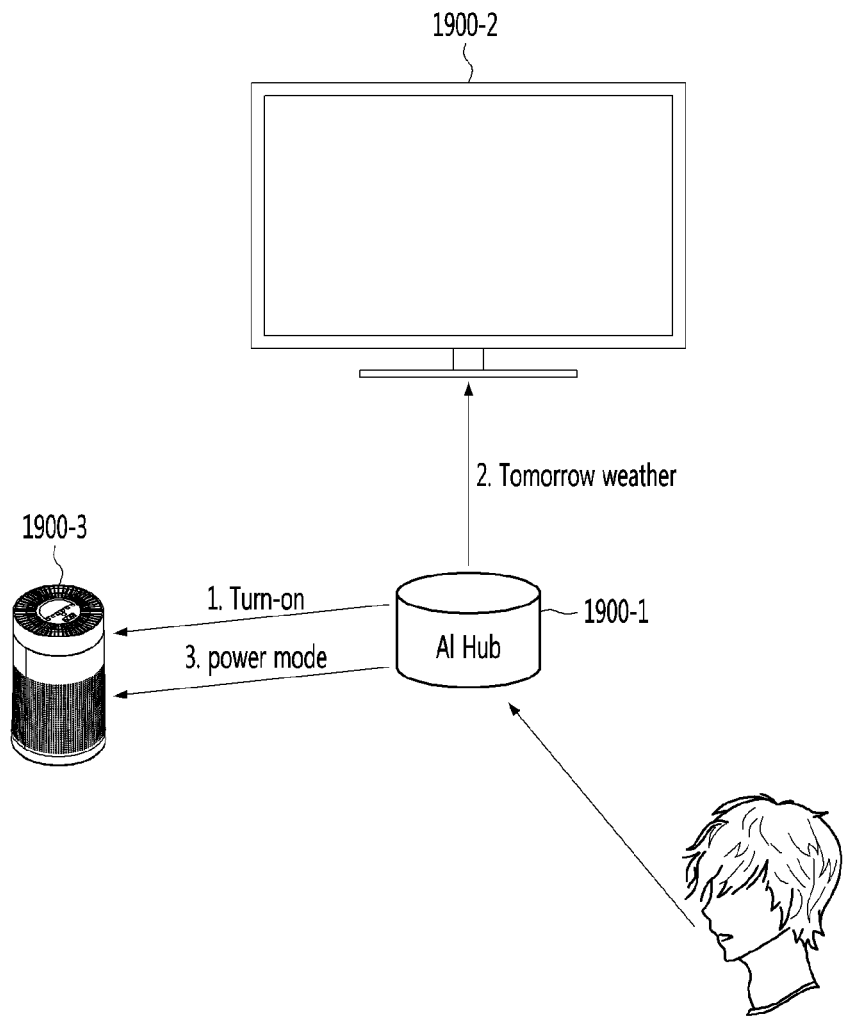
FIG. 22 is a diagram showing an example of determining a device to perform an operation command from among a plurality of artificial intelligence devices when a plurality of devices capable of performing an operation command uttered by a user is present.

In FIGS. 19 to 21, assume that an AI hub device 1900-1 is the artificial intelligence device 100-1 of FIG. 18, a TV 1900-2 is the first external artificial intelligence device 100-2, and an air cleaner 1900-3 is the second external artificial intelligence device 100-3.

In addition, in FIGS. 19 to 21, assume that the speech quality level is the volume of the operation command.

The AI hub device 1900-1 may perform wireless communication with the TV 1900-2 and the air cleaner 1900-3.

The AI hub device 1900-1 may receive, from the TV 1900-2, the identification information of the TV 1900-2, the name of the TV 1900-2, a model name and information on functions capable of being performed by the TV 1900-3.

Similarly, the AI hub device 1900-1 may receive, from the air cleaner 1900-3, the identification information of the air cleaner 1900-3, a name, a model name and information on functions capable of being performed by the air cleaner 1900-3.

Referring to FIG. 20, a graph showing volume change of the speech command uttered by the user with time is shown.

First, the user sequentially utters a first operation command 2010 having a first time interval t1, a second operation command 2030 having a second time interval t2 and a third operation command 2050 having a third time interval t3.

The AI hub device 1900-1 may receive the first operation command 2010 and acquire the first volume and first intention of the received first operation command 2010.

The AI hub device 1900-1 may acquire the first intention of the first operation command 2010 using speech data corresponding to the first operation command 2010.

The AI hub device 1900-1 may recognize that the intention of <turn on air cleaner> is to turn on the air cleaner 1900-3.

The AI hub device 1900-1 may search for the air cleaner 1900-3 using information on a device connected thereto and, as shown in FIG. 21, transmit, to the searched air cleaner 1900-3, a control command for turning on the air cleaner 1900-3.

The air cleaner 1900-3 may be turned on according to the control command received from the AI hub device 1900-1.

Thereafter, the AI hub device 1900-1 may receive the second operation command 2030 and acquire the second volume and second intention of the second operation command 2030.

The AI hub device 1900-1 may compare the first volume with the second volume and determine whether a difference between the first volume and the second volume is equal to or greater than a predetermined volume range as the result of comparison.

For example, assume that the first volume is 20, the second volume is 50 and the predetermined volume range is 10 to 20. Here, the predetermined volume range is merely an example and a reference value may be a predetermined fixed value.

Since the difference between the first volume and the second volume is 30 and is not within the predetermined volume range, the AI hub device 1900-1 may recognize reception of the second operation command 2030 as trigger for changing the device to be controlled.

The AI hub device 1900-1 may recognize an intention to change the device to be controlled and acquire the intention of <tell me tomorrow weather> which is the second operation command 2030.

The AI hub device 1900-1 may acquire the intention of the user who wants to know tomorrow's weather.

The AI hub device 1900-1 may search for the remaining device excluding the air cleaner 1900-3, which has performed operation corresponding to the first intention of the first operation command, and may determine whether the TV 1900-2 which is the remaining device is capable of performing the second intention.

Upon determining that the TV 1900-2 is capable of performing the second intention based on the prestored functions of the TV 1900-2, the AI hub device 1900-1 may determine the TV 1900-2 as the device to perform the second intention.

The AI hub device 1900-1 may transmit a control command for outputting the tomorrow's weather corresponding to the second intention to the TV 1900-2, as shown in FIG. 21.

The TV 1900-2 may output the tomorrow's weather according to the control command received from the AI hub device 1900-1.

According to the embodiment of the present invention, it is possible to grasp the volume and intention of the speech command of the user and to clearly select the device to perform operation corresponding to the speech command.

Accordingly, the user can obtain a desired result, by simply uttering the speech command for changing the volume of utterance.

In addition, the user can accurately obtain a desired result by uttering only a command for performing desired operation without uttering the name of a device, thereby improving user experience.

Meanwhile, referring to FIG. 20 again, the AI hub device 1900-1 may receive the third operation command 2050 and acquire the third volume and third intention of the third operation command 2050.

The AI hub device 1900-1 may compare the second volume with the third volume and determine whether a difference between the second volume and the third volume is equal to or greater than a predetermined volume range as the result of comparison.

For example, assume that the second volume is 50, the third volume is 20, and a difference between the second volume and the third volume is 30 and is not within the predetermined volume range.

Since the difference between the second volume and the third volume is not within the predetermined volume range, the AI hub device 1900-1 may recognize reception of the third operation command 2050 as trigger for changing the device to be controlled.

In one embodiment, the AI hub device 1900-1 may recognize trigger for changing the device to be controlled to an existing device to be controlled when the third volume is equal to the first volume.

In another example, when the difference between the third volume and the first volume is within the predetermined volume range, the AI hub device 1900-1 may recognize trigger for changing the device to be controlled to an existing device to be controlled.

The AI hub device 1900-1 may recognize the intention to change the device to be controlled and acquire the intention of <go to power mode> which is the third operation command 2050.

That is, the AI hub device 1900-1 may acquire the user's intention to change the mode to a strong mode.

The AI hub device 1900-1 may search for a device having a strong mode and determine the searched air cleaner 2010 as the device to be controlled.

The AI hub device 1900-1 may determine the air cleaner 1900-3 having the function of the strong mode as a device capable of performing the third intention and transmit a control command for requesting switching to the strong mode to the air cleaner 1900-3 as shown in FIG. 21.

Therefore, the air cleaner 1900-3 may switch the operation mode to the strong mode.

Next, FIG. 22 will be described.

In FIG. 22, assume that the operation command is <turn on the light>.

The AI hub device may confirm that the first and second external artificial intelligence devices are capable of performing the operation command, in a process of searching for the device to perform the intention of the operation command.

In this case, the AI hub device may determine a device to perform the intention corresponding to the operation command from between the first and second external artificial intelligence devices, based on a distance therefrom.

For example, when the distance between the AI hub device and the first external artificial intelligence device is 2 m and the distance between the AI hub device and the second external artificial intelligence device is 5 m, the AI hub device may determine the first external artificial intelligence device as the device to perform the intention of the operation command.

That is, the AI hub device may determine the first external artificial intelligence device as first priority and determine the second external artificial intelligence device as second priority.

This is because, as the distance between the AI hub device and the external artificial intelligence device decreases, the control signal is more rapidly transmitted from the AI hub device to the external artificial intelligence device.

When the control signal is more rapidly transmitted, the result of operation corresponding to the operation command of the user may be more rapidly provided to the user.

When the first external artificial intelligence device is turned off, the AI hub device may determine the second external artificial intelligence device as the device to be controlled, regardless of the distance.

That is, the AI hub device may transmit a control signal suiting the intention of the user to the second external artificial intelligence device.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the processor 180 of the artificial intelligence device.

The invention claimed is:

1. An artificial intelligence device comprising:
a microphone configured to receive a command uttered by a user;
a wireless communication unit configured to perform communication with an external artificial intelligence device; and
a processor configured to:
receive a first operation command through the microphone,
acquire a first speech quality level and a first intention of the received first operation command,
determine a first external artificial intelligence device to perform the acquired first intention,
transmit a first control command corresponding to the first intention to the determined first external artificial intelligence device,
receive a second operation command through the microphone, acquire a second speech quality level and a second intention of the received second operation command, and
change a device for performing the second intention from the first external artificial intelligence device to a second external artificial intelligence device when a difference between the first speech quality level and the second speech quality level is equal to or greater than a predetermined level range,
wherein the processor is further configured to:
measure a distance between the user and the artificial intelligence device when a movement of the user is detected, and
adjust an appropriate range of a volume according to the measured distance between the user and the artificial intelligence device, wherein the appropriate range is a range of the volume required for the artificial intelligence device to change to an activation state according to a wake-up command.

2. The artificial intelligence device according to claim 1, wherein the processor searches for the second external artificial intelligence device to perform operation corresponding to the second intention and transmits a second control command corresponding to the second intention to the second external artificial intelligence device.

3. The artificial intelligence device according to claim 2, wherein the first speech quality level is a first volume of the first operation command and the second speech quality level is a second volume of the second operation command, and
wherein the processor determines that the device to be controlled is changed when a difference between the first volume and the second volume is not within a predetermined volume range.

4. The artificial intelligence device according to claim 3, wherein the processor recognizes a trigger indicating change of the device to be controlled when the difference between the first volume and the second volume is not within a predetermined volume range.

5. The artificial intelligence device according to claim 3, wherein the processor:

receives a third operation command,
acquires a third volume and a third intention of the received third operation command, and
determines that the device to be controlled is changed when a difference between the second volume and the third volume is not within the predetermined volume range.

6. The artificial intelligence device according to claim 5, wherein the processor determines the first external artificial intelligence device as the device to be controlled when a difference between the third volume and the first volume is not within a predetermined volume range.

7. The artificial intelligence device according to claim 2, wherein, when a plurality of devices to perform the second intention is searched, the processor determines a device having a smallest distance from the artificial intelligence device as the device to be controlled.

8. The artificial intelligence device according to claim 1, wherein the processor transmits the received first and second operation commands to a natural language processing server, receives an intention analysis result from the natural language processing server, and acquires respective intentions of the first and second operation commands based on the received intention analysis result.

9. The artificial intelligence device according to claim 8, wherein the intention analysis result includes an external artificial intelligence device to perform an operation command and operation to be performed by the external artificial intelligence device.

10. A method of operating an artificial intelligence device capable of controlling operation of another device, the method comprising:
receiving a first operation command;
acquiring a first speech quality level and a first intention of the received first operation command;
determining a first external artificial intelligence device to perform the acquired first intention;
transmitting a first control command corresponding to the first intention to the determined first external artificial intelligence device;
receiving a second operation command through a microphone;
acquiring a second speech quality level and a second intention of the received second operation command; and
changing a device for performing the second intention from the first external artificial intelligence device to a second external artificial intelligence device when a difference between the first speech quality level and the second speech quality level is equal to or greater than a predetermined level range,
wherein the method further comprises:
measuring a distance between the user and the artificial intelligence device when a movement of the user is detected, and
adjusting an appropriate range of a volume according to the measured distance between the user and the artificial intelligence device, wherein the appropriate range is a range of the volume required for the artificial intelligence device to change to an activation state according to a wake-up command.

11. The method according to claim 10, further comprising searching for the second external artificial intelligence device to perform operation corresponding to the second intention and transmitting the second control command corresponding to the second intention to the second external artificial intelligence device.

12. The method according to claim 11,
wherein the first speech quality level is a first volume of the first operation command and the second speech quality level is a second volume of the second operation command, and
wherein the method further includes determining that the device to be controlled is changed when a difference between the first volume and the second volume is not within a predetermined volume range.

13. The method according to claim 12, further comprising:
receiving a third operation command;
acquiring a third volume and a third intention of the received third operation command; and
determining that the device to be controlled is changed when a difference between the second volume and the third volume is not within the predetermined volume range.

14. The method according to claim 13, further comprising determining the first external artificial intelligence device as the device to be controlled, when a difference between the third volume and the first volume is not within a predetermined volume range.

15. The method according to claim 11, further comprising, when a plurality of devices to perform the second intention is searched, determining a device having a smallest distance from the artificial intelligence device as the device to be controlled.

* * * * *